(12) United States Patent
Endoh et al.

(10) Patent No.: US 7,040,872 B2
(45) Date of Patent: May 9, 2006

(54) ROTARY FLUID MACHINERY

(75) Inventors: Tsuneo Endoh, Wako (JP); Haruhiko Komatsu, Wako (JP); Ryuji Sano, Wako (JP); Kensuke Honma, Wako (JP); Yasunari Kimura, Wako (JP); Tsutomu Takahashi, Wako (JP); Yuichiro Tajima, Wako (JP); Hiroshi Ichikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 107 days.

(21) Appl. No.: 10/363,645

(22) PCT Filed: Sep. 4, 2001

(86) PCT No.: PCT/JP01/07656

§ 371 (c)(1),
(2), (4) Date: Sep. 8, 2003

(87) PCT Pub. No.: WO02/20988

PCT Pub. Date: Mar. 14, 2002

(65) Prior Publication Data

US 2004/0031383 A1    Feb. 19, 2004

(30) Foreign Application Priority Data

Sep. 4, 2000  (JP) .............................. 2000-271509

(51) Int. Cl.
*F04B 1/04* (2006.01)
*F04B 35/00* (2006.01)

(52) U.S. Cl. ........................... 417/273; 417/405; 92/72
(58) Field of Classification Search ................ 417/273, 417/405, 398; 92/72; 91/491; 184/6.16
See application file for complete search history.

(56) References Cited

U.S. PATENT DOCUMENTS

| 2,660,123 | A | * | 11/1953 | Vlachos ....................... 417/351 |
| 3,568,645 | A | * | 3/1971 | Grimm ........................ 418/264 |
| 3,585,904 | A | | 6/1971 | White |
| 3,904,327 | A | * | 9/1975 | Edwards et al. ............... 418/8 |
| 4,184,821 | A | * | 1/1980 | Smolinski et al. ............ 418/93 |
| 4,299,546 | A | * | 11/1981 | Stout ........................... 418/13 |
| 4,354,809 | A | * | 10/1982 | Sundberg .................... 418/268 |
| 4,410,305 | A | * | 10/1983 | Shank et al. ................ 418/150 |

(Continued)

FOREIGN PATENT DOCUMENTS

JP          46-28943          8/1974

(Continued)

*Primary Examiner*—Charles G. Freay
(74) *Attorney, Agent, or Firm*—Birch, Stewart, Kolasch & Birch, LLP

(57) ABSTRACT

Pistons (41) are slidably received in a plurality of cylinders (39) disposed radially in a rotor (31), and a plurality of vanes (42) cooperating with the pistons (41) are disposed radially in the rotor (31), so that a vane chamber (54) is defined between a pair of the adjacent vanes (42). The radial movements of each of the pistons (41) and each of the vanes (42) are substantially stopped, so that the volumes of each of the cylinders (39) and each of the vane chambers (54) are not changed, for a period from the end of an exhaust stroke at which a gas-phase working medium is discharged from the cylinder (39) and the vane chamber (54) to the start of an intake stroke at which the supplying of the gas-phase working medium is started. Thus, it is possible to prevent the generation of a water hammer phenomenon due to a liquid-phase working medium confined in the cylinder (39) and the vane chamber (54).

20 Claims, 19 Drawing Sheets

U.S. PATENT DOCUMENTS

| | | | |
|---|---|---|---|
| 5,545,014 A * | 8/1996 | Sundberg et al. | 417/204 |
| 5,558,511 A * | 9/1996 | Hedelin | 418/150 |
| 6,030,191 A * | 2/2000 | Wood et al. | 418/1 |
| 6,099,261 A * | 8/2000 | Worden | 417/204 |
| 6,513,482 B1 * | 2/2003 | Endoh et al. | 123/227 |
| 6,637,550 B1 * | 10/2003 | Koyama et al. | 184/6.16 |
| 6,668,786 B1 * | 12/2003 | Endoh et al. | 123/227 |
| 6,675,765 B1 * | 1/2004 | Endoh et al. | 123/227 |
| 6,681,738 B1 * | 1/2004 | Endoh et al. | 123/227 |
| 6,761,143 B1 * | 7/2004 | Itoh et al. | 123/227 |

FOREIGN PATENT DOCUMENTS

| | | |
|---|---|---|
| JP | 57-16293 A | 1/1982 |
| JP | 59-41602 A | 3/1984 |
| JP | 60-206990 A | 10/1985 |
| JP | 2000-320543 A | 11/2000 |

* cited by examiner

ROTARY FLUID MACHINERY

FIELD OF THE INVENTION

The present invention relates to a rotary fluid machine capable of being used as an expander or a compressor.

BACKGROUND ART

A double multi-vane type rotary fluid machine system is described in Japanese Patent Application Laid-open No. 59-41602. In this rotary fluid machine system, a circular vane-supporting ring is disposed between an elliptic outer cam ring and an elliptic inner cam ring, and outer and inner ends of a plurality of vanes radially slidably supported on the vane-supporting ring are in abutment against an inner peripheral surface of the outer cam ring and an outer peripheral surface of the inner cam ring, respectively. Therefore, when the vane-supporting ring is rotated relative to the outer cam ring and the inner cam ring, the volumes of a plurality of vane chambers partitioned by the vanes between the outer cam ring and the vane-supporting ring are increased or decreased and in this manner, the rotary fluid machine system functions as an expander or compressor. In addition, the volumes of a plurality of vane chambers partitioned by the vanes between the inner cam ring and the vane-supporting ring are increased or decreased and in this manner, the rotary fluid machine system functions as an expander or compressor.

In this double multi-vane type rotary fluid machine system, the outer and inner rotary fluid machines can be used as independent expanders, respectively; the outer and inner rotary fluid machines can be used as independent compressors, respectively; and one and the other of the outer and inner rotary fluid machines can be used as an expander and a compressor, respectively.

A vane-type rotary fluid machine system capable of being used as an expander or a compressor is described in Japanese Patent Application Laid-open No. 60-206990. In this rotary fluid machine system, a circular intermediate cylinder is disposed eccentrically between a circular outer cam ring and a circular inner cam ring disposed concentrically with each other, and outer and inner ends of a plurality of vanes radially slidably supported in the intermediate cylinder are in abutment against an inner peripheral surface of the outer cam ring and an outer peripheral surface of the inner cam ring, respectively. Therefore, when the intermediate cylinder is rotated relative to the outer cam ring and the inner cam ring, the volumes of a plurality of vane chambers partitioned by the vanes between the outer cam ring and the intermediate cylinder are increased or decreased and in this manner, the rotary fluid machine system functions as an expander or a compressor. In addition, the volumes of a plurality of vane chambers partitioned by the vanes between the inner cam ring and the intermediate cylinder are increased or decreased and in this manner, the rotary fluid machine system functions as an expander or a compressor.

In this vane-type rotary fluid machine system, the outer and inner rotary fluid machines can be used as independent expanders, respectively; the outer and inner rotary fluid machines can be used as independent compressors, respectively; and in addition, the outer and inner rotary fluid machines can be connected in line to each other and operated as a two-stage expander or a two-stage compressor by allowing a working fluid passed through one of the outer and inner rotary fluid machines to be passed through the other rotary fluid machine.

A rotary fluid machine disclosed in Japanese Patent Application Laid-open No. 2000-320543 includes vane piston units each including a combination of a vane and a piston, so that the pistons slidably received in cylinders mounted radially in a rotor convert a pressure energy of a gas-phase working medium and a rotational energy of a rotor from one into another through a power-converting device including an annular groove and a roller, and vanes radially slidably supported in the rotor convert the pressure energy of the gas-phase working medium and the rotational energy of the rotor from one into another.

In such a vane-type fluid machine, the volume of a vane chamber defined between a pair of the adjacent vanes is decreased in an exhaust stroke and increased in a suction stroke, but in order to prevent the blowing-through of the working medium between an exhaust port and an intake port, it is desirable to eliminate a period during which the vane chamber is simultaneously in communication with the exhaust port and the intake port. In this case, if the volume of the vane chamber is decreased or increased for a period from the end of the exhaust stroke at which the vane chamber and the exhaust port are put out of communication with each other to the start of the suction stroke at which the vane chamber and the intake port are put into communication with each other, the following disadvantages occur:

When the volume of the vane chamber is changed during such a period, if the lubricating water or oil which is a non-compressible fluid is confined in the vane chamber, there is a possibility that a so-called water hammer phenomenon may be generated to cause a vibration or a noise, or a larger load may be applied, resulting in a reduction in durability. In the expander, as soon as the intake port which is a high-pressure port is put into communication with the vane chamber, if the amount of protrusion of one of the pair of vanes defining the vane chamber, which is located on the side of the exhaust port, is large, there is a possibility that the pressure of the high-pressure working medium drawn from the intake port to the vane on the side of the exhaust port may be applied, whereby the rotor may be rotated reversely, or a torque for rotating the rotor reversely may be generated.

At the cold starting or the like of the rotary fluid machine including the pistons, the gas-phase working medium supplied to cylinders may be cooled and liquefied in some cases. If each of the pistons is moved in each of the cylinders in this state for a period from the closing of a gas-phase working medium discharge port of a rotary valve for supplying and discharging the gas-phase working medium to and from the cylinder to the opening of a gas-phase working medium supply port, there is a possibility that a so-called water hammer phenomenon is generated to cause a vibration or a noise, because a liquid-phase working medium confined in the cylinder is a non-compressible fluid.

BRIEF SUMMARY OF THE INVENTION

The present invention has been accomplished with the above-described circumstances in view, and it is an object of the present invention to prevent the generation of the water hammer phenomenon due to the liquid-phase working medium confined in an operating chamber of the rotary fluid machine.

To achieve the above object, according to a first aspect and feature of the present invention, there is proposed a rotary fluid machine including a rotor chamber, a rotor rotatably accommodated in the rotor chamber, operating members radially movably supported in the rotor, operating chambers whose volumes are varied due to the movement of the working members with the rotation of the rotor, so that a pressure energy of a gas-phase working medium supplied and discharged to and from the operating chambers in response to the rotation of the rotor and a rotational energy of the rotor are converted from one into another, characterized in that the radial movements of the operating members are substantially stopped, so that the volumes of the operating chambers assume substantially constant values, for a period from the end of an exhaust stroke at which the gas-phase working medium is discharged from the operating chambers to the start of an intake stroke at which the gas-phase working medium is supplied to the operating chambers.

With the above arrangement, the radial movements of the operating members are substantially stopped, so that the volumes of the operating chambers assume the substantially constant values, for the period from the end of the exhaust stroke at which the gas-phase working medium is discharged from the operating chambers to the start of the intake stroke at which the gas-phase working medium is supplied to the operating chambers. Therefore, even if a non-compressible liquid-phase working medium is confined in the closed operating chambers, the generation of a water hammer phenomenon can be prevented to prevent the vibration, a noise and a reduction in durability of the rotary fluid machine.

According to a second aspect and feature of the present invention, in addition to the first feature, the operating members are a plurality of vanes which are supported radially in the rotor for movements into and from the rotor and are in sliding contact with an inner peripheral surface of the rotor chamber; the operating chambers are a plurality of vane chambers each of which is defined by adjacency to two of the vanes, an outer peripheral surface of the rotor and the inner peripheral surface of the rotor chamber; and the shape of the rotor chamber is determined, so that the volume of each of the vane chambers assumes a substantially constant value for a period from the end of the exhaust stroke at which each of the vane chambers and exhaust ports are put out of communication with each other to the start of the intake stroke at which each of the vane chambers and intake ports are put into communication with each other.

With the above arrangement, the volume of each of the vane chambers assumes the substantially constant value for the period from the end of the exhaust stroke to the start of the intake stroke by virtue of the determination of the shape of the rotor chamber. Therefore, even if the non-compressible gas-phase working medium is confined in each of the vane chamber between the exhaust ports and the intake ports, the generation of a water hammer phenomenon can be prevented to prevent the vibration, a noise and a reduction in durability of the vane-type rotary fluid machine. Moreover, when the vane-type rotary fluid machine functions as an expander, as soon as the intake ports which are high-pressure ports are put into communication with each of the vane chambers, a pressure in the vane chamber is applied equally to a pair of the vanes defining the vane chamber. Therefore, it is possible to prevent the rotor from being rotated reversely, or to prevent a torque for rotating the rotor reversely from being generated.

According to a third aspect and feature of the present invention, in addition to the first feature, the operating chambers are a plurality of cylinders which are provided radially in the rotor; the operating members are a plurality of pistons which are slidably received in the cylinders; the machine further includes supply ports and discharge ports for supplying and discharging the gas-phase working medium to and from each of the cylinders with the rotation of the rotor; and the radial movement of each of the pistons is substantially stopped for a period from the closing of the discharge ports to the opening of the supply ports.

With the above arrangement, when the gas-phase working medium supplied into each of the cylinders is cooled and liquefied at the cold start or the like of the rotary fluid machine, the movement of the piston is substantially stopped for the period from the closing of the gas-phase working medium discharge ports to the opening of the gas-phase working medium supply ports, namely, a period during which a liquid-phase working medium resulting from the liquefaction of the gas-phase working medium is confined in the cylinder. Therefore, it is possible to reliably prevent the generation of a water hammer phenomenon.

According to a fourth aspect and feature of the present invention, in addition to the first feature, the operating members include a plurality of vanes which are supported radially in the rotor for sinking and protruding movements into and from the rotor and are in sliding contact with an inner peripheral surface of the rotor chamber; the operating chambers include a plurality of vane chambers each of which is defined by adjacency to two of the vanes, an outer peripheral surface of the rotor and the inner peripheral surface of the rotor chamber; and the shape of the rotor chamber is determined, so that the volume of each of the vane chambers assumes a substantially constant value for a period from the end of the exhaust stroke at which each of the vane chambers and exhaust ports are put out of communication with each other to the start of the intake stroke at which each of the vane chambers and intake ports are put into communication with each other; and the operating chambers include a plurality of cylinders which are provided radially in the rotor; the operating members include a plurality of pistons which are slidably received in the cylinders; the machine further includes supply ports and discharge ports for supplying and discharging the gas-phase working medium to and from the cylinders with the rotation of the rotor; and the radial movement of each of the pistons is substantially stopped for a period from the closing of the discharge ports to the opening of the supply ports.

With the above arrangement, the volume of each of the vane chambers assumes the substantially constant value for the period from the end of the exhaust stroke to the start of the intake stroke by virtue of the determination of the shape of the rotor chamber. Therefore, even if the non-compressible gas-phase working medium is confined in each of the vane chamber between the exhaust ports and the intake ports, the generation of a water hammer phenomenon can be prevented to prevent the vibration, a noise and a reduction in durability of the vane-type rotary fluid machine. Moreover, when the vane-type rotary fluid machine functions as an expander, as soon as the intake ports which are high-pressure ports are put into communication with each of the vane chambers, a pressure in the vane chamber is applied equally to a pair of the vanes defining the vane chamber. Therefore, it is possible to prevent the rotor from being rotated reversely, or to prevent a torque for rotating the rotor reversely from being generated. Further, when the gas-phase working medium supplied into each of the cylinders is cooled and liquefied at the cold start or the like of the rotary fluid machine, the movement of the piston is substantially stopped for the period from the closing of the gas-phase working medium discharge ports to the opening of the gas-phase working medium supply ports, namely, a period during which a liquid-phase working medium resulting from the liquefaction of the gas-phase working medium is confined in the cylinder. Therefore, it is possible to reliably prevent the generation of a water hammer phenomenon.

According to a fifth aspect and feature of the present invention, in addition to the third or fourth feature, sliding surfaces of the rotor and the vanes are lubricated by the liquid-phase working medium, and a portion of the liquid-phase working medium for lubricating the sliding surfaces of the rotor and the vanes is supplied to the sliding surfaces of the cylinders and the pistons to seal them.

With the above arrangement, the liquid-phase working medium is supplied to the sliding surfaces of the cylinders and the pistons. Therefore, the sliding surfaces can be sealed effectively by virtue of a resistance provided by the viscosity of the liquid-phase working medium to prevent the blowing-off of the gas-phase working medium, and moreover, even if the liquid-phase working medium is incorporated into the gas-phase working medium, there is no possibility that a disadvantage occurs, such as in a case where oil is incorporated into the gas-phase working medium. A portion of the liquid-phase working medium for lubricating the sliding surfaces of the rotor and the vanes is bypassed and also utilized for the sealing and hence, it is unnecessary to specially provide a path for supplying the liquid-phase working medium used for the sealing. This can contribute to the simplification of the structure.

A piston 41 and a vane 42 in each of embodiments correspond to the operating members of the present invention; a cylinder 39 and a vane chamber 54 in the embodiments correspond to the operating chambers of the present invention; first and second introducing bore groups 107 and 108 in the embodiments correspond to the intake ports of the present invention; first and second discharging bore groups 110 and 111 in the embodiments correspond to the discharge ports of the present invention; water and vapor in the embodiment correspond to the liquid-phase working medium and the gas-phase working medium of the present invention.

BRIEF DESCRIPTION OF THE DRAWINGS

FIGS. 1 to 15 show a first embodiment of the present invention.

FIG. 1 is a diagrammatic illustration of a waste heat recovery system for an internal combustion engine;

FIG. 2 is a vertical sectional view of an expander, corresponding to a sectional view taken along a line 2—2 in FIG. 5;

FIG. 3 is an enlarged sectional view of an area around a rotational axis in FIG. 2;

FIG. 4 is a sectional view taken along a line 4—4 in FIG. 2;

FIG. 5 is an enlarged sectional view of essential portions, taken along a line 5—5 in FIG. 2;

FIG. 6 is a diagram showing sectional shapes of a rotor chamber and a rotor;

FIG. 7 is a front view of a vane body;

FIG. 8 is a side view of the vane body;

FIG. 9 is a sectional view taken along a line 9—9 in FIG. 7;

FIG. 10 is a front view of a seal member;

FIG. 11 is an enlarged view of an area around the rotational axis in FIG. 4;

FIG. 14 is a graph showing the relationship between the suction-starting angle and the expansion ratio;

FIG. 15 is a graph showing the relationship between the phase of the roller and the load in the present invention.

FIG. 16 is a vertical sectional view of a rotor, similar to FIG. 4;

FIG. 17 is sectional view taken along a line 17—17 in FIG. 16;

FIG. 18 is sectional view taken along a line 18—18 in FIG. 16;

FIG. 19 is sectional view taken along a line 19—19 in FIG. 18; and

FIG. 20 is an exploded perspective view of a lubricating water-dispensing portion of the rotor.

DETAILED DESCRIPTION OF THE INVENTION

A first embodiment of the present invention will be first described with reference to FIGS. 1 to 15.

Figure 1:
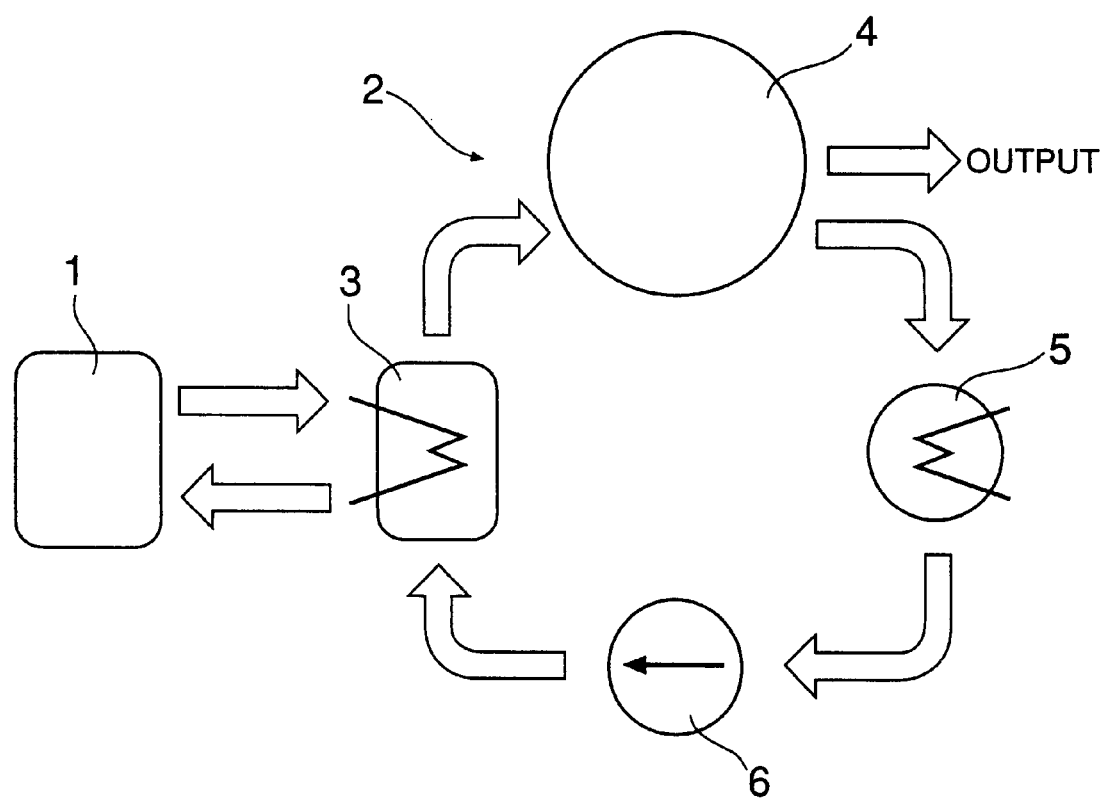

Referring to FIG. 1, a waste heat recovery system 2 for an internal combustion engine 1 includes an evaporator 3 for generating a vapor in a high-pressure state with a raised temperature, namely, a high-temperature and high-pressure vapor from a liquid, e.g., water in a high-pressure state, using a waste heat, e.g., an exhaust gas from the internal combustion engine 1 as a heat source, an expander 4 for generating an output by the expansion of the high-temperature and high-pressure vapor, a condenser 5 for liquefying the vapor dropped in temperature and pressure after being expanded, namely, the dropped-temperature and dropped-pressure vapor discharged from the expander 4, and a supply pump 6 for supplying the liquid, e.g., water from the condenser 5 under a pressure again to the evaporator 3.

The expander 4 has a special structure and is formed in the following manner.

Referring to FIGS. 2 to 5, a casing 7 includes first and second casing halves 8 and 9 made of a metal. Each of the first and second casing halves 8 and 9 includes a main body 11 having a substantially elliptic recess 10, and a circular flange 12 integrally with the main body 11, and a substantially elliptic rotor chamber 14 is defined by superposing both of the flanges 12 one on another with a metal gasket 13 interposed therebetween. An outer surface of the main body 11 of the first casing half 8 is covered with a deep bowl-shaped main body 16 of a shell-shaped member 15, and a circular flange 17 integrally with the main body 16 is superposed on the circular flange 12 of the first casing half 8 with a gasket 18 interposed therebetween. The three circular flanges 12, 12 and 17 are fastened together at a plurality of circumferential points by bolts 19. Thus, a relay chamber 20 is defined between the main bodies 11 and 16 of the shell-shaped member 15 and the first half 8.

The main bodies 11 of the halves 8 and 9 have hollow bearing tubes 21 and 22 provided on their outer surface to protrude outwards, respectively, and a larger-diameter portion 24 of a hollow output shaft 23 extending through the rotor chamber 14 is rotatably supported in the hollow bearing tubes 21 and 22 through a metal bearing (or a resinous bearing) 25. Thus, an axis L of the output shaft 23 passes through an intersection between a longer diameter and a shorter diameter in the rotor chamber 14 having a substantially elliptic shape. A smaller-diameter portion 26 of the output shaft 23 protrudes to the outside from a bore 27 provided in the hollow bearing tube 22 of the second half 9 and is connected to a transmitting shaft 28 through a spline coupling 29. The smaller-diameter 26 and the bore 27 are sealed by two seal rings 30.

A circular rotor 31 is accommodated in the rotor chamber 14, and a shaft-mounting bore 32 provided at the center of the rotor 31 and the larger-diameter portion 24 of the output shaft 23 are in a fitted relation to each other with a meshed/coupled portion 33 provided therebetween. Thus, a rotational axis of the rotor 31 is brought into line with the axis L of the output shaft 23 and hence, is designated commonly by a reference character "L".

A plurality of, e.g., twelve (in the present embodiment), slot-shaped spaces 34 are defined at circumferentially equal distances in the rotor 31 to extend radially from the shaft-mounting bore 32 about the rotational axis L. The spaces 34 each assume a substantially U-shape in a phantom plane perpendicular to opposite end faces 35 of the rotor 31, so that each of them has a small circumferential width, and they open serially into the opposite end faces 35 and an outer peripheral surface 36 of the rotor 31.

First to twelfth vane piston units U1 to U12 having the same structure are mounted radially for reciprocal movement within the slot-shaped spaces 34 in the following manner: A stepped bore 38 is defined in each of the U-shaped spaces 34 at a portion 37 defining an inner periphery of the space 34, and a stepped cylinder member 39 made of a ceramic (or carbon) is fitted into the stepped bore 38. The cylinder member 39 has a smaller-diameter portion a whose end face is in abutment against an outer peripheral surface of the larger-diameter portion 24 of the output shaft 23, and a smaller-diameter bore b communicating with a through-bore c which opens into the outer peripheral surface of the larger-diameter portion 24. A guide tube 40 is disposed outside the cylinder member 39, so that it is located coaxially with the member 39. The guide tube 40 has an outer end locked in an opening of the space 34 existing in the outer peripheral surface 36 of the rotor 31, and has an inner end fitted into a larger-diameter bore d in the stepped bore 38 to abut against the cylinder member 39. The guide tube 40 also has a pair of elongated grooves e, which extend from its outer end to near its inner end in an opposed relation to each other, and both of the elongated grooves e face the space 34. A piston 41 made of a ceramic is slidably received in a larger-diameter cylinder bore f in the cylinder member 39, so that a tip end of the piston 41 is always located within the guide tube 40.

Figure 2:
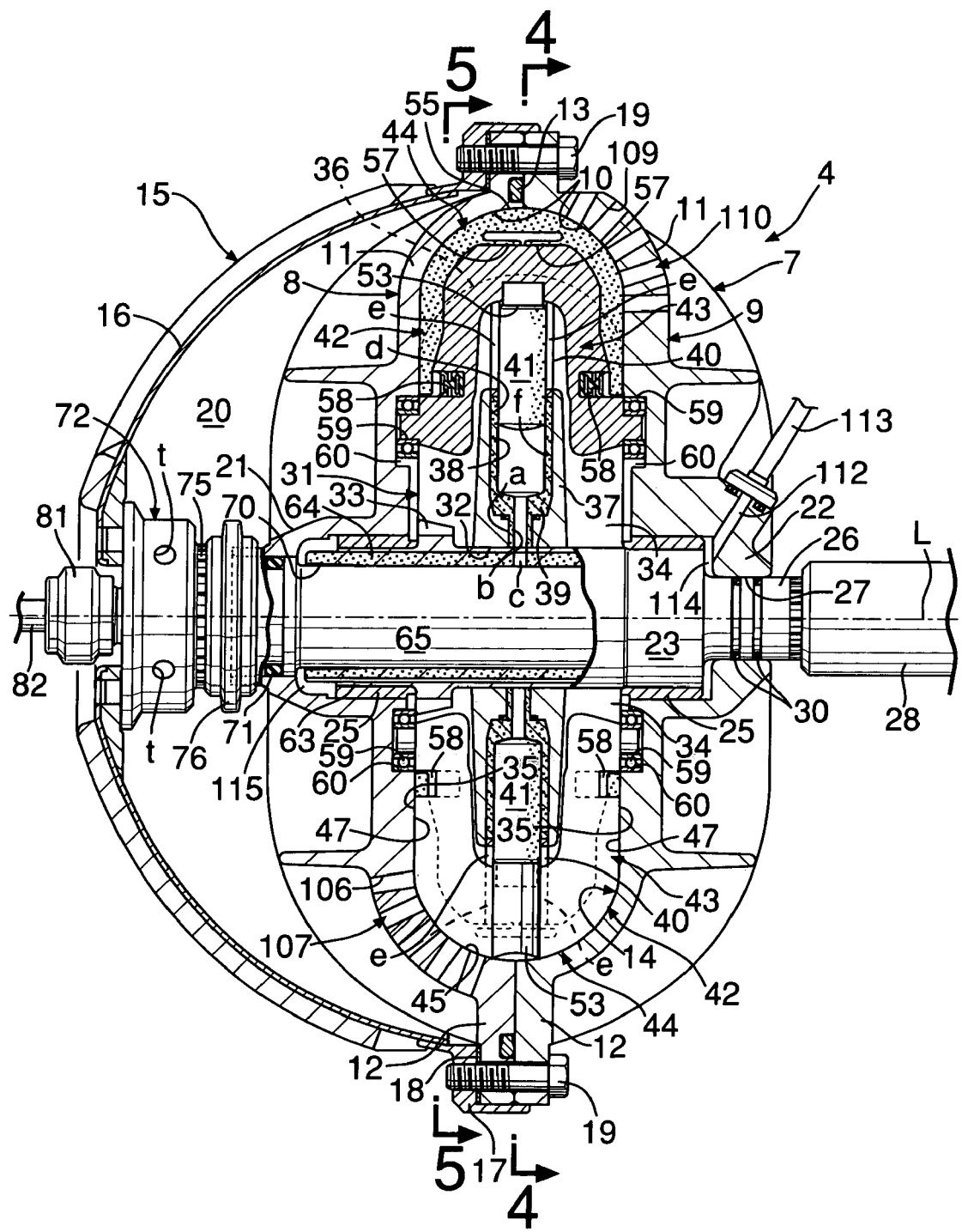
Figure 6:
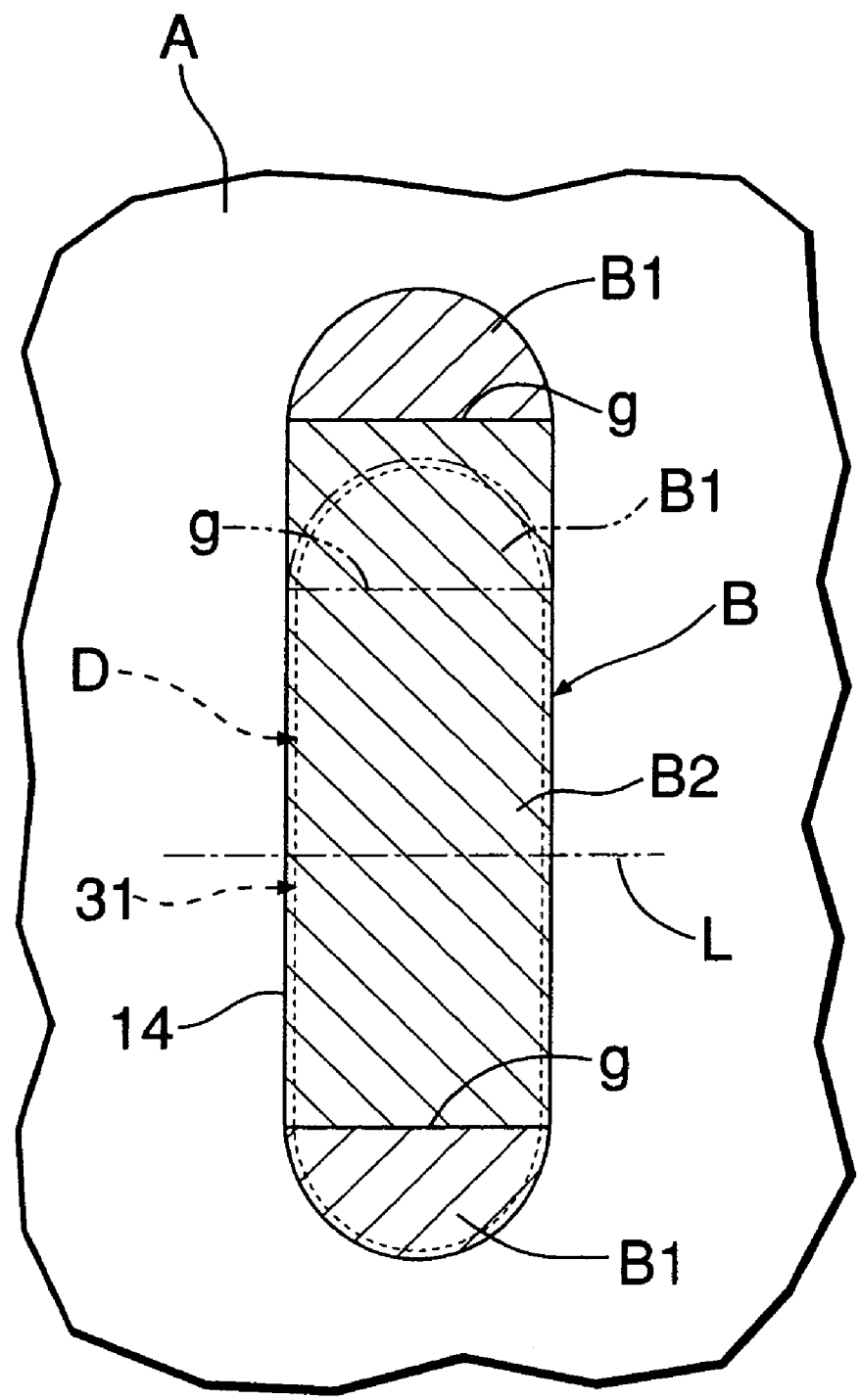
Figure 7:
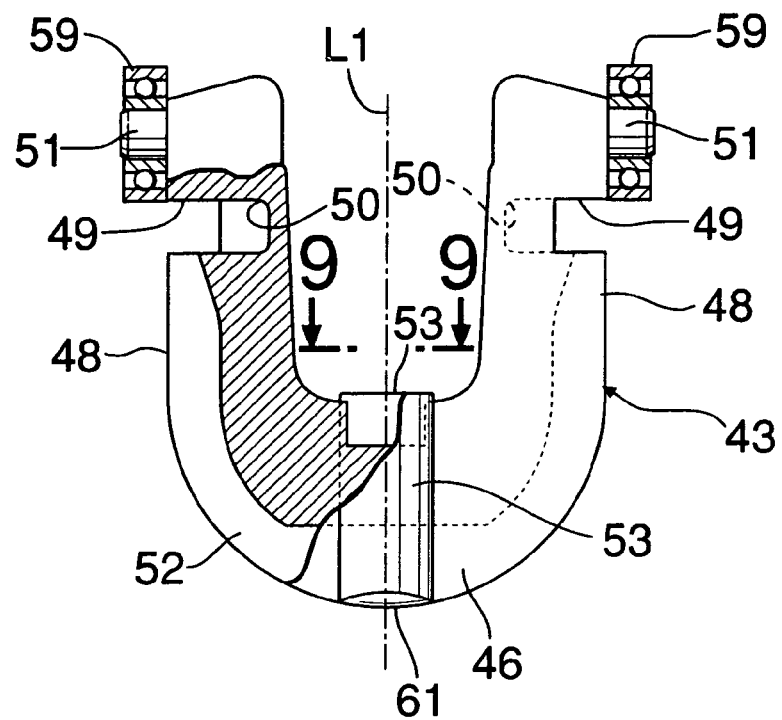
Figure 8:
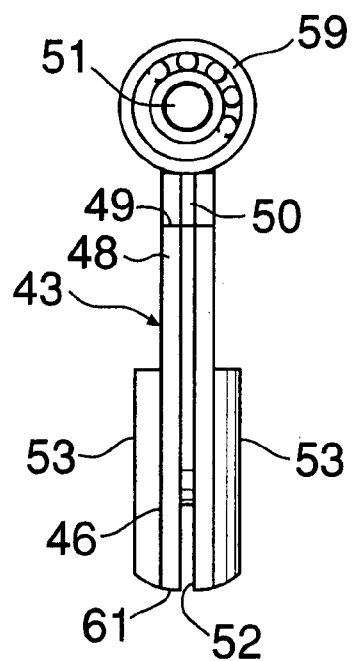
Figure 9:
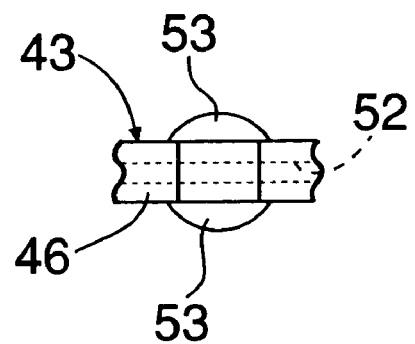
Figure 10:
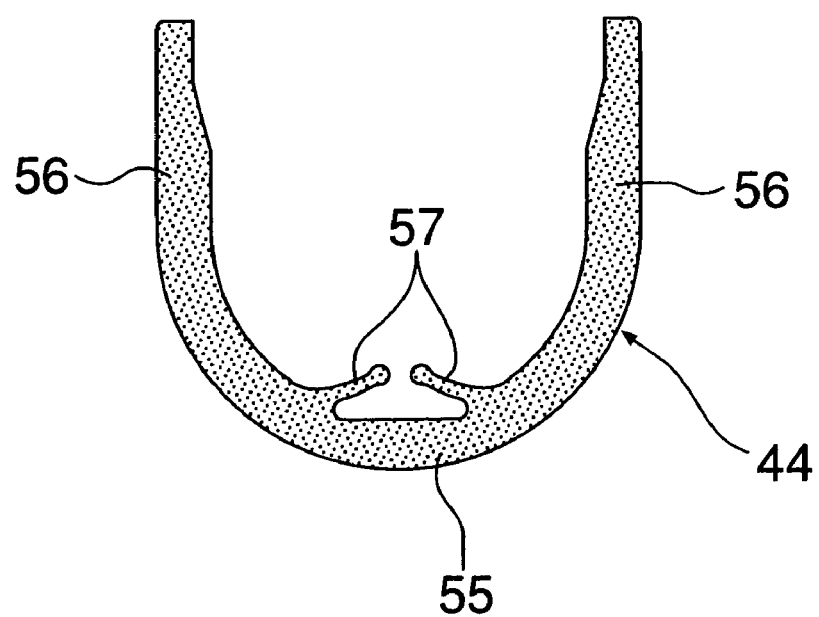

As shown in FIGS. 2 and 6, the section B of the rotor chamber 14 in a phantom plane A including the rotational axis L of the rotor 31 includes a pair of semi-circular section portions B1 having diameters g opposed to each other, and a quadrilateral section portion B2 formed to connect opposed ends of one of the diameters g of the semi-circular section portions B1 to each other and to connect opposed ends of the other diameter g to each other, and forms a substantially athletic track shape. In FIG. 6, a portion shown by a solid line indicates the largest section including a longer diameter, while a portion partially shown by a two-dot dashed line indicates the smallest section including a shorter diameter. The rotor 31 has a section D slightly smaller than the smallest section including the shorter diameter of the rotor chamber 14, as shown in a dotted line in FIG. 6.

As best shown in FIGS. 2 and 7 to 10, the vane 42 includes a vane body 43 having a substantially U-shape (a horseshoe shape), a seal member 44 having a substantially U-shaped plate and mounted on the vane body 43, and a vane spring 58.

The vane body 43 includes a semi-arcuate portion 46 corresponding to an inner peripheral surface 45 formed by the semi-circular section portion B1 of the rotor chamber 14, and a pair of parallel portions 48 corresponding to the opposed inner end faces 47 formed by the quadrilateral section portion B2. Provided at an end portion of each of the parallel portions 48 are U-shaped notches 49, quadrilateral blind bores 50 which open into bottom faces of the notches 49, and short shafts 51 existing at locations displaced from the notches 49 toward the end to extend outwards. A U-shaped groove 52 is defined serially in outer peripheral portions of the semi-arcuate portion 46 and the parallel portions 48 to open outwards, and communicates at its opposite ends with the notches 49, respectively. Further, a pair of projections 53 each having an arched section are provided on opposite flat faces of the semi-arcuate portion 46. The projections 53 are disposed, so that an axis L1 of a phantom column formed by them corresponds with a line which bisects the distance between both of the parallel portions 48 and bisects the semi-arcuate portion 46 in a circumferential direction. Inner ends of the projections 53 protrude slightly into a space between both of the parallel portions 48.

The seal member 44 is formed of, for example, PTFE, and includes a semi-arcuate portion 55 for sliding on the inner peripheral surface 45 formed by the semi-circular section portion B1 of the rotor chamber 14, and a pair of parallel portions 56 for sliding on opposed inner end faces 47 formed by the quadrilateral section portion B2. A pair of resilient claws 57 are provided on an inner peripheral surface of the semi-arcuate portion 55, so that it is warped inwards.

The seal member 44 is mounted in the U-shaped groove 52 in the vane body 43; a vane spring 58 is fitted into each of the blind bores 50, and further, a roller 59 having a ball bearing structure is mounted on each of the short shafts 51. Each of the vanes 42 is slidably accommodated in each of the slot-shaped space 34 in the rotor 31. In this case, the projections 53 of each of the vane body 43 are located within the guide tube 40, and opposite sides of the projections 53 are located within the elongated grooves e in the guide tube 40, respectively, whereby inner end faces of the projections 53 can be put into abutment against an outer end face of the piston 41. The rollers 59 are rollably engaged in non-circular annular grooves 60 defined in the opposed inner end faces 47 of the first and second halves 8 and 9. A distance between each of the annular grooves 60 and the rotor chamber 14 is constant over the entire periphery. In addition, the advancing movement of the piston 41 is converted into the rotational movement of the rotor 31 by the engagement of the rollers 59 and the annular grooves 60 with each other through the vane 42.

Figure 5:
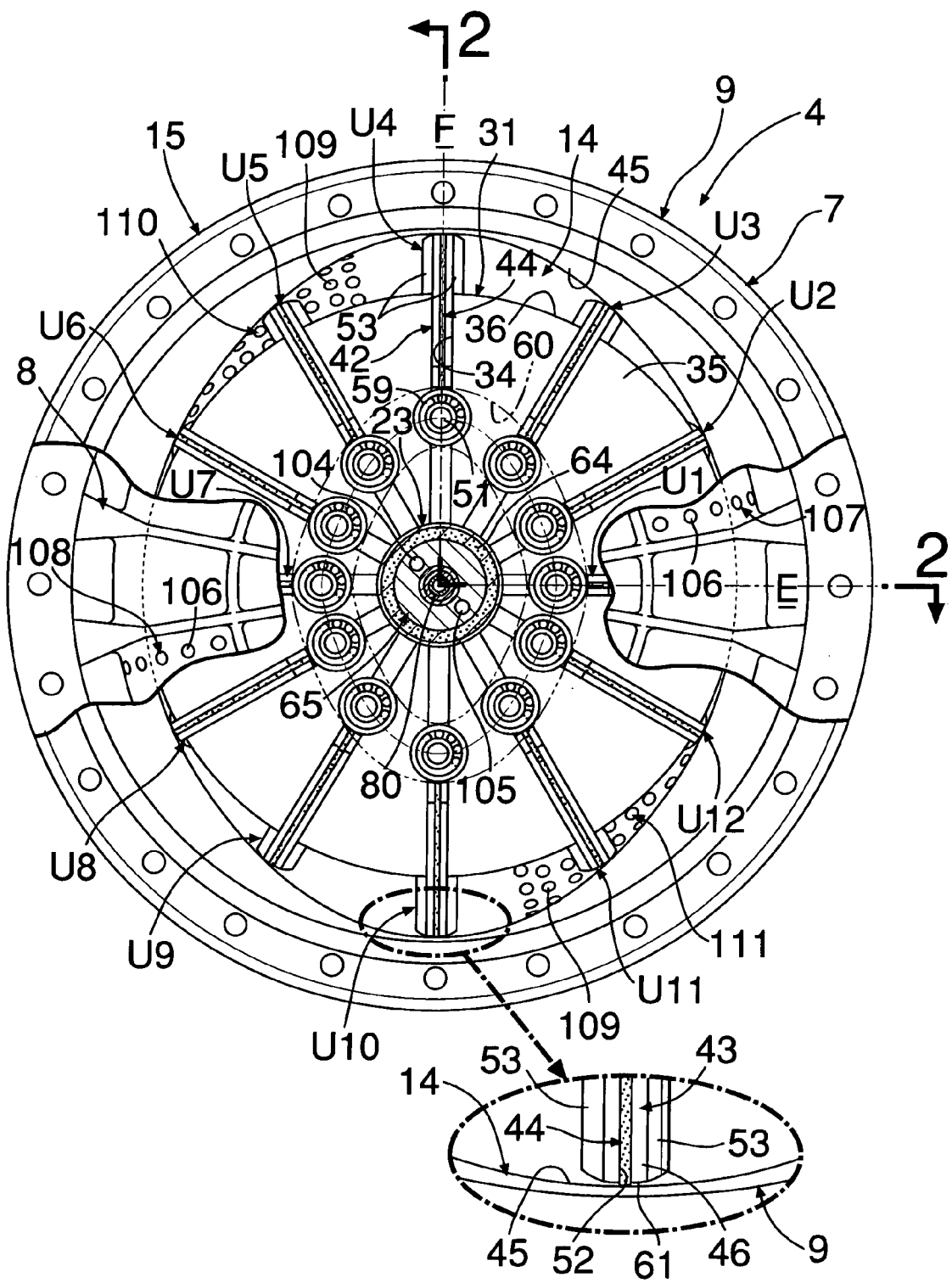

A semi-arcuate tip end face 61 of the semi-arcuate portion 46 of the vane body 43 is always spaced from the inner peripheral surface 45 of the rotor chamber 14, and the both of the parallel portions 48 are always spaced from the opposed inner end faces 47 of the rotor chamber 14, as best shown in FIG. 5, by virtue of the cooperation of the rollers 59 and the annular grooves 60 with each other, whereby the friction loss is alleviated. Loci are defined by the two annular grooves 60 formed as a pair. Therefore, the vane 42 is rotated at a vary small displacement angle in an axial direction through the rollers 59 due to an error between the left and right loci to increase the pressure of contact with the inner peripheral surface 45 of the rotor chamber 14. At this time, the amount of this displacement can be decreased remarkably, because a portion of the vane body 43 having the substantially U-shape (the horseshoe shape), which contacts with the casing 7, has a small diametrical length, as compared with a rectangular (oblong) vane. As best shown in FIG. 2, the parallel portions 56 of the seal member 44 are put into close contact with the opposed inner end faces 47 of the rotor chambers 14 by repulsive forces of the vane springs 58 to provide a sealing action, particularly, for the annular grooves 60 through between the ends of the parallel portions 56 and the vane 42. The resilient claws 57 are pushed between the vane body 43 and the inner peripheral surface 45 within the rotor chamber 14, whereby the semi-arcuate portion 55 is brought into close contact with the inner peripheral surface 45. Such close contact is good, because the substantially U-shaped vane 42 has no point of inflection, unlike the rectangular (oblong) vane. The rectangular vane has corners, and it is difficult to maintain the sealability in the rectangular vane. Thus, the sealability between the vane 42 and the rotor chamber 14 is improved. Further, the vane 42 and the rotor chamber 14 are deformed with the thermal expansion. In this case, the substantially U-shaped vane 42 is deformed more uniformly with a similar figure, as compared with the rectangular vane and hence, the clearance between the vane 42 and the rotor chamber 14 is less varied, and the sealability can be maintained favorably.

A sealing action between the vane body 43 and the inner peripheral surface 45 of the rotor chamber 14 is produced by a spring force of the seal member 44 itself, a centrifugal force applied to the seal member 44 itself and a vapor pressure provided when a vapor flowing from the rotor chamber 14 on a higher-pressure side into the U-shaped groove 52 in the vane body 43 pushes up the seal member 44. In this way, this sealing action is not influenced by the excessive centrifugal force applied to the vane body 43 in accordance with the rotational speed of the rotor 31 and hence, a sealing surface pressure is not relied on the centrifugal force applied to the vane body 43, and both of the good sealability and a low-friction property can be established.

As described above, twelve vane chambers 54 (see FIG. 4) varying in volume with the rotation of the rotor 31 are defined by the twelve vanes 42 supported radially in the rotor 31, the inner peripheral surface 45 of the rotor chamber 14 and the outer peripheral surface 36 of the rotor 31.

Figure 3:
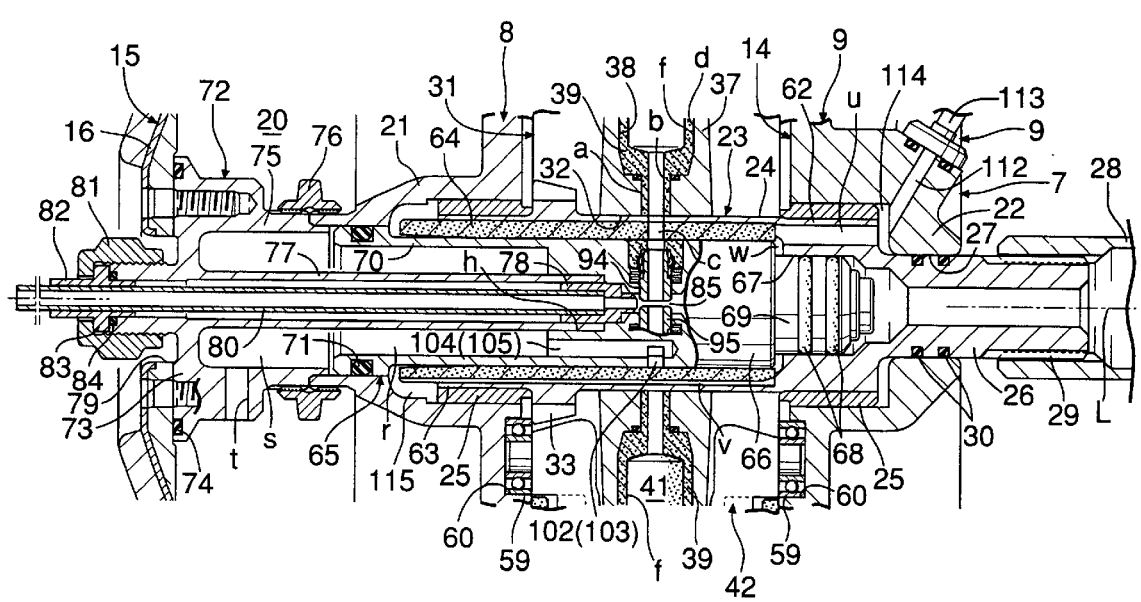

Referring to FIGS. 2 and 3, the larger-diameter portion 24 of the output shaft 23 includes a thickened portion 62 supported on the metal bearing 25 of the second half 9, and a thinned portion 63 extending from the thickened portion 62 and supported on the metal bearing 25 of the first half 8. A hollow shaft 64 made of a ceramic (or a metal) is fitted into the thinned portion 63, so that it can be rotated in unison with the output shaft 23. A fixing shaft 65 is disposed inside the hollow shaft 64, and includes a larger-diameter solid portion 66 fitted in the hollow shaft 64, so that it ranges within the axial thickness of the rotor 31, a smaller-diameter solid portion 69 fitted into a bore 67 provided in the thickened portion 62 of the output shaft 23 with two seal rings 68 interposed therebetween, and a thinner hollow portion 70 extending from the larger-diameter solid portion 66 and fitted into the hollow shaft 64. A seal ring 71 is interposed between an outer peripheral surface of an end of the hollow portion 70 and an inner peripheral surface of the hollow bearing tube 21 of the first half 8.

In the main body 16 of the shell-shaped member 15, an end wall 73 of a hollow tube 72 located coaxially with the output shaft 23 is mounted on an inner surface of a central portion of the main body 16 with a seal ring 74 interposed therebetween. A short outer tube 75 extending inwards from an outer periphery of the end wall 73 is connected at its inner end to the hollow bearing tube 21 of the first half 8 through a connecting tube 76. A smaller-diameter and long inner pipe 77 is mounted in the end wall 73 to extend through the end wall 73 and fitted at its inner end into stepped bore h provided in the larger-diameter solid portion 66 of the fixing shaft 65 along with a short hollow connecting pipe 78 protruding from the inner pipe 77. An outer end of the inner pipe 77 protrudes outwards from the bore 79 in the shell-shaped member 15, and an inner end of a first high-temperature and high-pressure vapor-introducing pipe 80 inserted from such outer end through the inner pipe 77 is fitted in the hollow connecting pipe 78. A cap member 81 is threadedly fitted over the outer end of the inner pipe 77, and a flange 83 of a holder tube 82 for retaining the introducing pipe 80 is press-fitted by the cap member 81 to an outer end face of the inner pipe 77 with a seal ring 84 interposed therebetween.

As shown in FIGS. 2 to 4 and 11, a rotary valve V is mounted, as described below, at the larger-diameter solid portion 66 of the fixing shaft 65, and adapted to supply a high-temperature and high-pressure vapor through the plurality of, e.g., twelve (in the present embodiment) through-bores c defined serially in the hollow shaft 64 and the output shaft 23 to the cylinder members 39 of the first to twelfth vane piston units U1 to U12 and to discharge a first dropped-temperature and dropped-pressure vapor after being expanded from the cylinder members 39 through the through-bores c.

Figure 11:
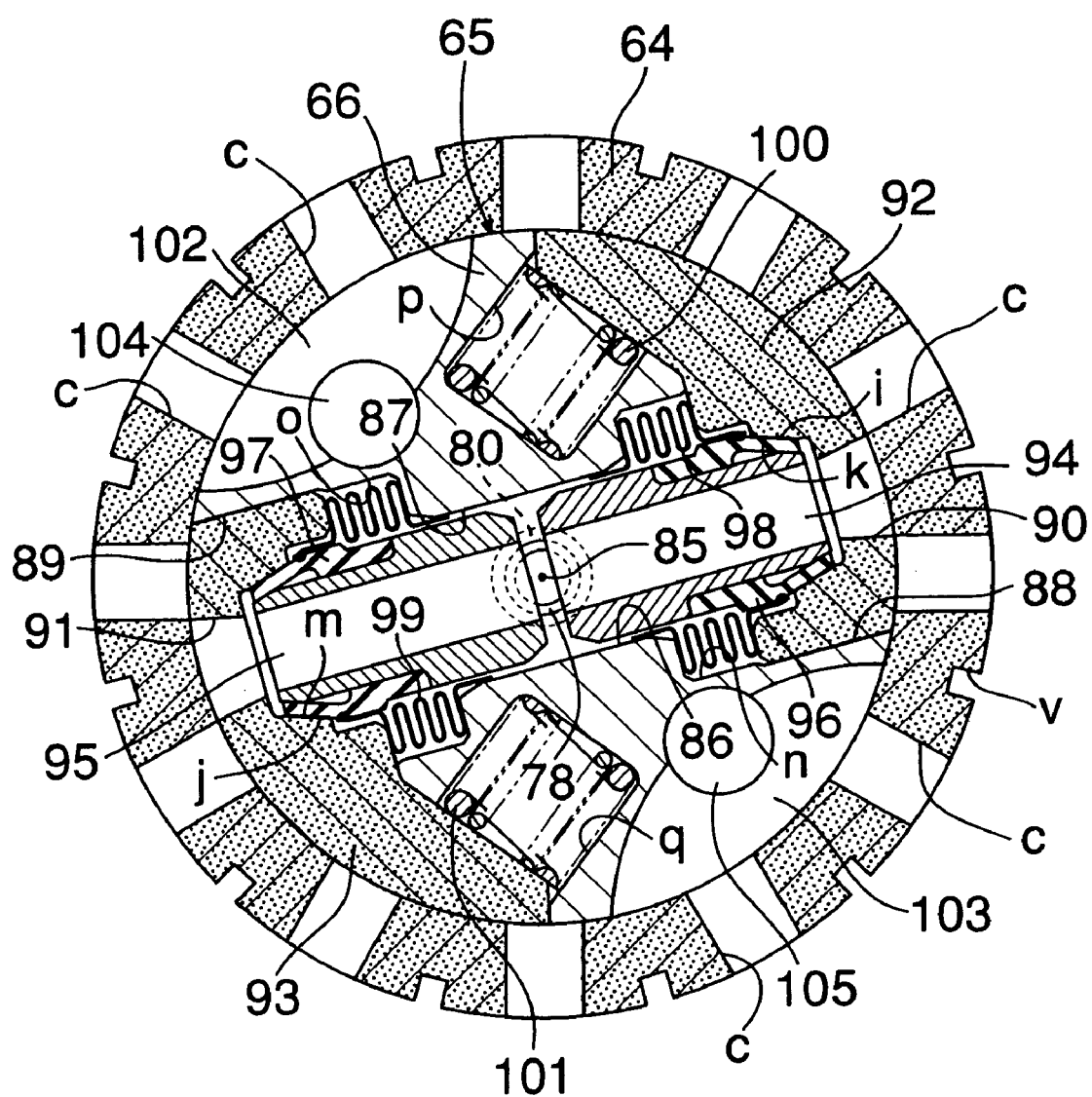

The structure of the rotary valve V for supplying and discharging the vapor with a predetermined timing to and from the cylinder member 39 of the expander 4 is shown in FIG. 11. First and second bores 86 and 87 are defined in the larger-diameter solid portion 66 to extend in opposite directions from a space 85 communicating with the hollow connecting pipe 78, and open into bottom surfaces of first and second recesses 88 and 89 which open into the outer peripheral surface of the larger-diameter solid portion 66. First and second sealing blocks 92 and 93 made of carbon and having supply ports 90 and 91 are mounted in the first and second recesses 88 and 89, so that their outer peripheral surfaces are in sliding/rubbing contact with the inner peripheral surface of the hollow shaft 64. First and second short supply pipes 94 and 95 coaxial with each other are loosely inserted into the first and second bores 86 and 87, and tapered outer peripheral surfaces i and J of first and second sealing tubes 96 and 97 fitted over outer peripheral surfaces of tip ends of the first and second supply pipes 94 and 95 are fitted to inner peripheral surfaces of tapered bores k and m located inside and leading to the supply ports 90 and 91 of the first and second sealing blocks 92 and 93. First and second annular recesses n and o surrounding the first and second supply pipes 94 and 95 and first and second blind bore-shaped recesses p and q adjoining the first and second annular recesses n and o are defined in the larger-diameter solid portion 66 to face the first and second sealing blocks 92 and 93. First and second bellows-shaped elastic members 98 and 99 fitted at one-ends thereof over outer peripheral surfaces of the first and second sealing tubes 96 and 97 are accommodated in the first and second annular recesses n and o, and first and second coil springs 100 and 101 are accommodated in the first and second blind bore-shaped recesses p and q, so that the first and second sealing blocks 92 and 93 are pushed against the inner peripheral surface of the hollow shaft 64 by repulsive forces of first and second bellows-shaped elastic members 98 and 99 and the first and second coil springs 100 and 101.

Defined in the larger-diameter solid portion 66 between the first coil spring 100 and the second bellows-shaped elastic member 99 and between the second coil spring 101 and the first bellows-shaped elastic member 98, are first and second recessed discharge portions 102 and 103 which are always in communication with two of the through-bores c, and first and second discharge bores 104 and 105 extending from the discharge portions 102 and 103 in parallel to the introducing pipe 80 and opening into a hollow r in the fixing shaft 65, respectively.

The members of the same type prefixed by "first" and "second" such as the first sealing block 92 and the second sealing block 93 are in a relation of point-symmetry to each other with respect the axis of the fixing shaft 65.

The inside of the hollow r in the fixing shaft 65 and the inside of the outer tube portion 75 of the hollow tube 72 are passages s for the first dropped-temperature and dropped-pressure vapor, which passages s communicate with the relay chamber 20 through a plurality of through-bores t made through a peripheral wall of the outer tube portion 75.

As shown in FIGS. 2 and 5, first and second introducing bore groups 107 and 108 each including a plurality of introducing bores 106 arranged radially are defined in the outer peripheral portion of the body 11 of the first half 8 in the vicinity of the opposite ends of the shorter diameter of the rotor chamber 14, so that the first dropped-temperature and dropped-pressure vapor within the relay chamber 20 is introduced into the rotor chamber 14 via the introducing bore groups 107 and 108. A first discharging bore group 110 including a plurality of discharging bores 109 arranged radially and circumferentially is defined in the outer peripheral portion of the body 11 of the second half 9 between one end of the longer diameter of the rotor chamber 14 and the second introducing bore group 108, and a second discharging bore group 111 including a plurality of discharging bores 109 arranged radially and circumferentially is also defined in the outer peripheral portion of the body 11 of the second half 9 between the other end of the longer diameter of the rotor chamber 14 and the first introducing bore group 107. A second dropped-temperature and dropped-pressure vapor further dropped in temperature and pressure by the expansion between the adjacent vanes 42 is discharged to the outside from the first and second discharging bore groups 110 and 111.

The output shaft 23 and the like are lubricated by the water, and a passageway for the lubricating water is arranged in the following manner: As shown in FIGS. 2 and 3, a water supply pipe 113 is connected to a water supply bore 112 defined in the hollow bearing tube 22 of the second half 9. The water supply bore 112 communicates with a housing 114 faced by the metal bearing 25 of the second half 9; the housing 114 communicates with a water bore u defined in the thickened portion 62 of the output shaft 23; the water bore u communicates with a plurality of water grooves v (see also FIG. 11) extending in a direction of a generating line of the outer peripheral surface of the hollow shaft 64; and each of the water grooves v communicates with a housing 115 faced by the metal bearing 25 of the second half 8. An annular recess w is provided in the inner end face of the thickened portion 62 of the output shaft 23 to permit the communication between the water bore u and a sliding section between the hollow shaft 64 and the larger-diameter solid portion 66 of the fixing shaft 65.

Thus, an area between each of the metal bearings and the output 23 and an area between the hollow shaft 64 and the fixing shaft 65 are lubricated by the water, and areas between the casing 7 and the seal member 44 as well as the rollers 59 are lubricated by the water flowing into the rotor chamber 14 from gaps between the metal bearings 25 and the output shaft 23.

Figure 4:
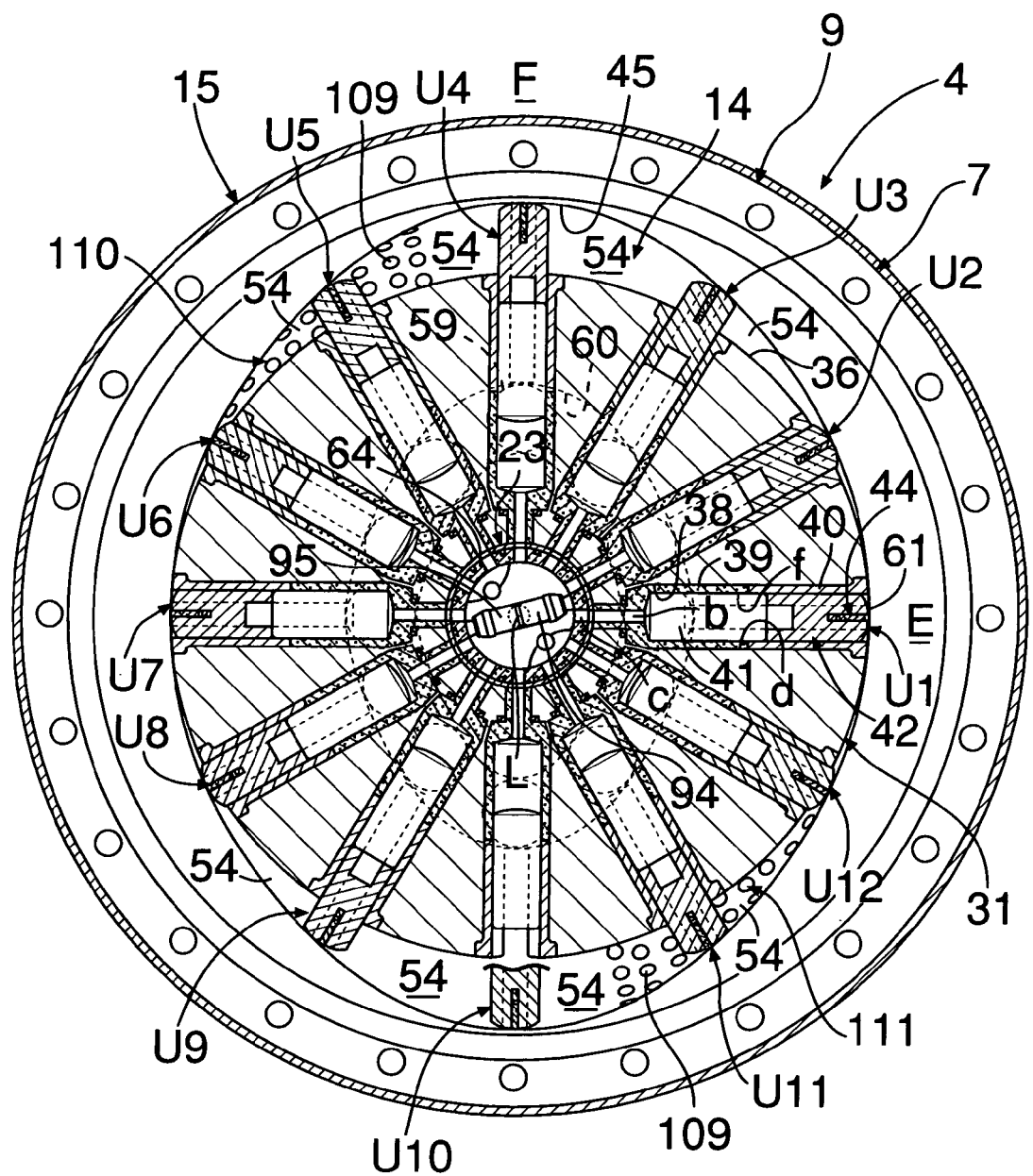

The first and seventh vane piston units U1 and U7 in the relation of point symmetry to each other with respect to the rotational axis L of the rotor 31 in FIG. 4 perform similar motions. This applies to the second and eighth vane piston units U2 and U8 in the relation of point symmetry to each other, and the like.

For example, referring also to FIG. 11, it is supposed that an axis of the first supply pipe 94 is slightly deviated in a counterclockwise direction in FIG. 4 from a position E at the shorter diameter of the rotor chamber 14, and the first vane piston unit U1 is located in the position E at the shorter diameter, so that the high-temperature and high-pressure vapor is not supplied to the larger-diameter cylinder bore f in the first vane piston unit U1; and hence, the piston 41 and the vane 42 are in retracted positions.

When the rotor 31 is rotated slightly from this state in the counterclockwise direction in FIG. 4, the supply port 90 in the first sealing block 92 and the through-bore c are put into communication with each other, thereby permitting the high-temperature and high-pressure vapor from the introducing pipe 80 to be introduced into the larger-diameter cylinder bore f through the smaller-diameter bore b. This causes the piston 41 to be advanced, and this advancing movement is converted into the rotational movement of the rotor 31 through the vane 42 by virtue of the engagement of the rollers 59 integral with the vane 42 and the annular grooves 60 with each other by the sliding of the vane 42 toward a position F at the longer diameter of the rotor chamber 14. When the through-bore c is deviated from the supply port 90, the high-temperature and high-pressure vapor is expanded in the larger-diameter cylinder bore f to further advance the piston 41, whereby continuing the rotation of the rotor 31. The expansion of the high-temperature and high-pressure vapor is finished at a time point when the first vane piston unit U1 reaches the position F at the larger diameter of the rotor chamber 14. Thereafter, the first dropped-temperature and dropped-pressure vapor within the larger-diameter cylinder bore f is discharged into the relay chamber 20 via the smaller-diameter bore b, the through-bore c, the first recess-shaped discharge portion 102, the first discharge bore 104, the passage s (see FIG. 3) and each of the through-bores t by the retraction of the piston 41 by the vane 42 with the rotation of the rotor 31. Then, such vapor is introduced into the rotor chamber 14 through the first introducing bore group 107, as shown in FIGS. 2 and 5, and further expanded between the adjacent vanes 42 to rotate the rotor 31. Thereafter, the second dropped-temperature and dropped-pressure vapor is discharged to the outside from the first discharging bore group 110.

In this way, the piston 41 is operated by the expansion of the high-temperature and high-pressure vapor to rotate the rotor 31 through the vane 42, and the rotor 31 is rotated through the vane 42 by the expansion of the dropped-temperature and dropped-pressure vapor resulting from the drop in pressure of the high-temperature and high-pressure vapor, thereby providing an output from the output shaft 23.

Figure 12B:
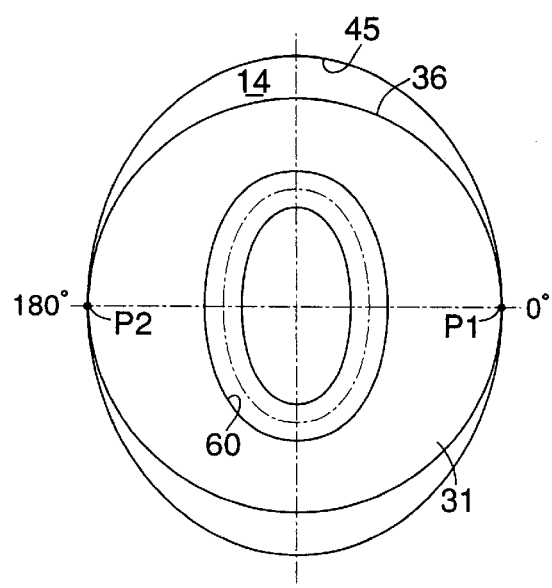
FIGS. 12A and 12B are diagrams showing the shapes of annular grooves in casings.
Figure 12A:
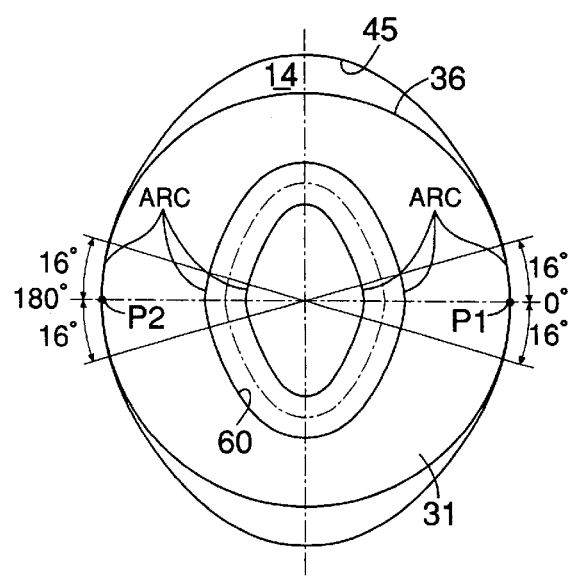

The shape of the annular groove 60 in the present embodiment is shown in FIG. 12A, and the shape of an annular groove 60 in the prior art is shown in FIG. 12B. The annular groove 60 in the prior art is of an elliptic shape, whereas the annular groove 60 in the present embodiment is of a rhombic shape with four apexes rounded. As a result, in the prior art, the clearance between the inner peripheral surface 45 of the rotor chamber 14 and the outer peripheral surface 36 of the rotor 31 assumes the smallest value at a point P1 in a phase of 0° and at a point P2 in a phase of 180°, and is gradually increased from the smallest value before and after these points. On the other hand, in the present embodiment, the clearance between the inner peripheral surface 45 of the rotor chamber 14 and the outer peripheral surface 36 of the rotor 31 is maintained at the constant smallest value in a range of ±16° based on the points P1 and P2, and is gradually increased from the smallest value before and after such range. Namely, each of the inner peripheral surface 45 of the rotor chamber 14 and the annular grooves 60 form a partial arc about the axis L in the range of ±16°.

The rotary valve V is operable to cut off the communication between the through-bore c and the first and second discharge bores 102 and 103 in a position of –160 based on the point P1 in the phase of 0° and the point P2 in the phase of 180° to finish the discharging of the vapor, and to permit the communication between the supply ports 90 and 91 and the through-bore c in a position of +16° based on the point P1 in the phase of 0° and the point P2 in the phase of 180° to start the supplying of the vapor. Therefore, an internal space in the cylinder 39 is closed in the range of ±16° based on the points P1 and P2. When the piston 41 is moved in a state in which the internal space in the cylinder 39 has been closed, there is no problem if the compressible water is present in the cylinder 39, but a water hammer phenomenon is generated if the non-compressible water is present in the cylinder 39. What is supplied to the cylinder 39 is the high-temperature and high-pressure vapor, but if the high-temperature and high-pressure vapor supplied to the cylinder 39 during the cold starting or the like of the expander 4 is cooled and liquefied, there is a possibility that the water may be resident in the cylinder 39 to cause a water hammer phenomenon.

In the present embodiment, however, it is possible to prevent the piston 41 from being moved relative to the cylinder 39 to reliably prevent the generation of the water hammer phenomenon, because the annular groove 60 forms the partial arc about the axis L in a region where the internal space in the cylinder 39 is closed, namely, in the range of ±16° based on the points P1 and P2.

Figure 13B:
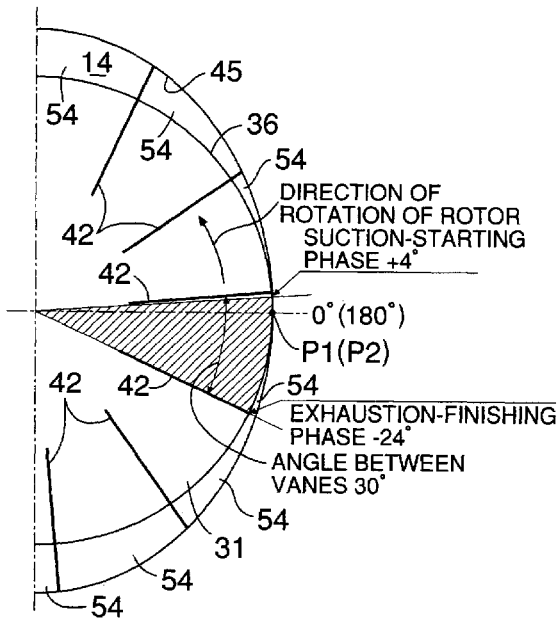
FIGS. 13A and 13B are diagrams showing the shapes of inner peripheral surfaces of the rotor chambers and intake and exhaust timings.
Figure 13A:
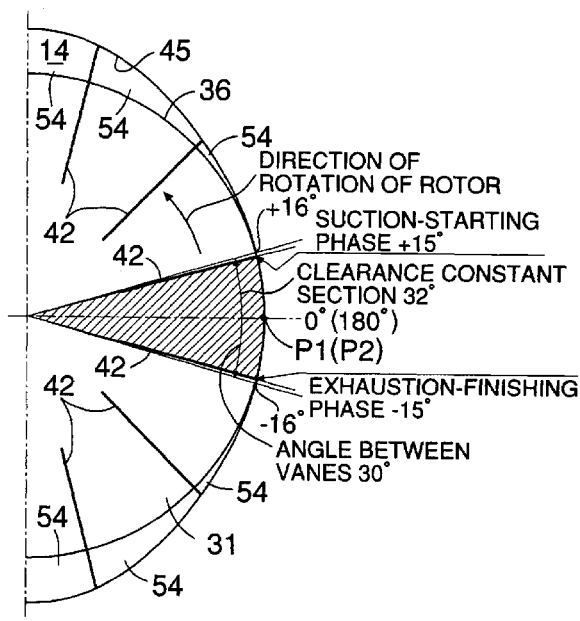

Intake and exhaust timings in the present embodiment are shown in FIG. 13A, and intake and exhaust timings in the prior art are shown in FIG. 13B. In either case, the twelve vanes 42 are supported at equal distances in the rotor 31 and hence, a center angle formed by a pair of the adjacent vanes 42 is 30°. In the prior art shown in FIG. 13B, a phase of the vane 42 (an exhaustion-finishing phase) upon cutting-off of the communication between the vane chamber 54 defined by a pair of the vanes 42 and the discharging bores 109 in the first and second discharging bore groups 110 and 111 is established at –24° based on the points P1 and P2, and a phase of the vane 42 (a suction-starting phase) upon communication of the vane chamber 54 with the introducing bores 106 in the first and second introducing bore groups 107 and 108 is established at +4° based on the points P1 and P2. Therefore, as soon as the communication between the vane chamber 54 and the low-pressure discharging bores 109 is cut off, the vapor is introduced, because the vane chamber 54 is already in communication with the high-pressure introducing bores 106. At this time, the suction-starting phase of +40 is asymmetric with the exhaustion-finishing phase of –24° and hence, the amount of protrusion of one of the pair of vanes 42 defining the vane chamber 54, which is on a delayed side in a rotational direction, is larger than that of the vane 42 on an advanced side in the rotational direction, and a larger vapor pressure is applied by the vane 42 in the delayed side in the rotational direction to apply a torque in a direction opposite from the rotational direction of the rotor 31. As a result, there is a possibility that a phenomenon of reverse rotation of the rotor 31 may be generated at the start of the machine, and a vibration due to a variation in torque may be generated during the operation of the machine.

In the prior art shown in FIG. 13B, a difference between the exhaust-finishing phase and the suction-starting phase is 28° and smaller than 30° which is an angle between the vanes. Therefore, there is a period while the vane chamber 54 is simultaneously in communication with the high-pressure introducing bores 106 and the low-pressure discharging bores 109, and the blowing of the vapor from the introducing bores 106 into the discharging bores 109 occurs to a slight extent for this period. To avoid this blowing of the vapor, it is necessary to eliminate the period during which the vane chamber 54 is simultaneously in communication with the high-pressure introducing bores 106 and the low-pressure discharging bores 109. For example, if the suction-starting phase is increased from +4° to +6° for this purpose, as soon as the communication between the vane chamber 54 and the low-pressure discharging bores 109 is cut off and the vane chamber 54 is put into communication with the high-pressure introducing bores 106, the volume of the vane chamber 54 is decreased temporarily. This is due to that the exhaustion-finishing phase and the suction-starting phase are longitudinally asymmetric with each other. When the volume of the closed vane chamber 54 is decreased in the above manner, there is a possibility that when the water resulting from the liquefaction of the vapor or the lubricating water has been confined in the vane chamber 54, a water hammer phenomenon may be generated to cause a vibration, a noise, a reduction in durability and the like.

On the other hand, in the present embodiment shown in FIG. 13A, the exhaustion-finishing phase and the suction-starting phase are established at –15° and +15°, and the clearance between the inner peripheral surface 45 of the rotor chamber 14 and the outer peripheral surface 36 of the rotor 31 is set constant in the phase section of –16° and +16°. Therefore, when the vapor is supplied from the high-pressure introducing bores 106 to the vane chamber 54, both of the amount of protrusion of one of the pair of vanes 42 defining the vane chamber 54, which is on the delayed side in the rotational direction and the amount of protrusion of the vane 42 on the advanced side in the rotational direction, become equal to the above-described clearance, and it is possible to prevent the application of the torque in the direction opposite from the rotational direction of the rotor 31 to avoid the generation of the phenomenon of reverse rotation of the rotor 31 and a variation in torque. Moreover, at the moment when the communication between the vane chamber 54 and the low-pressure discharging bores 109 is cut off and the vane chamber 54 is put into communication with the high-pressure introducing bores 106, the volume of the vane chamber 54 having the constant clearance is not changed. Therefore, even if the water has been confined in the vane chamber 54, there is no possibility that a water hammer phenomenon may be generated; and thus, it is possible to reliably prevent a vibration, a noise, a reduction in durability and the like.

It should be noted here that to convert the pressure energy of the vapor into the mechanical energy efficiently, it is necessary to increase the expansion ratio until the vapor drawn from the introducing bores 106 into the vane chamber 54 is discharged from the discharging bores 109 and for this purpose, it is desirable that the suction-starting phase is hastened as much as possible. However, this is inconvenient for ensuring a larger expansion ratio, because the suction-starting phase in the present embodiment is 15° and later than +4° assumed by the suction-starting phase in the prior art. Therefore, in the present embodiment, such a shape of the inner peripheral surface 45 of the rotor chamber 14 (namely, the shape of the annular groove 60) that the vapor suction volume at an initial stage of a suction stroke is decreased is employed, thereby ensuring an expansion ratio equivalent to that in the prior art.

Figure 14:
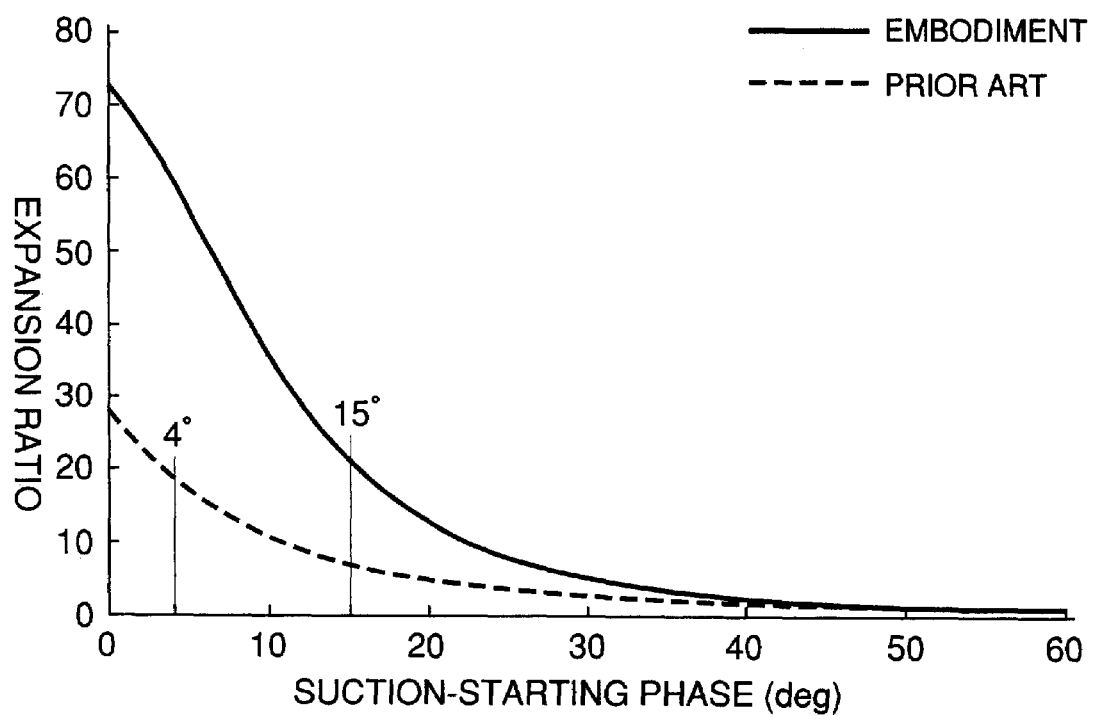

As can be seen from FIG. 14, in the prior art including the elliptic annular groove 60, the suction-starting phase is +4° and the expansion ratio is about 20. However, if the suction-starting phase is delayed from +4° to +15° without change in the shape of the annular groove 60 in order to prevent the above-described reverse rotation phenomenon and water hammer phenomenon, the expansion ratio is decreased from 20 to 7 (see a broken line). However, even if the suction-starting phase is delayed to +15°, an expansion ratio exceeding 20 can be ensured by employing the annular groove 60 of the rhombic shape with four apexes rounded in the present embodiment (see a solid line).

Three loads: a piston pressure load, a centrifugal force load and a vane pushing-down load are applied to the twelve rollers 59 rolled in states of engagement in the annular grooves 60 during operation of the expander 4. The piston pressure load is such a load that the piston 41 connected to the roller 59 is urged radially outwards by the vapor pressure. The magnitude of the piston pressure load is relied on the pressure and amount of the vapor supplied to the cylinder member 39 to push the piston 41, and the direction of the piston pressure load is a positive direction (radially outward). The centrifugal force load is such a load that the vane piston units U1 to U12 integrally provided with the rollers 59 are pushed radially outwards by the centrifugal force. The magnitude of the centrifugal force load is relied on the mass, the radial position and the angular speed of the vane piston units U1 to U12, and the direction of the centrifugal force load is a positive direction (radially outward). The vane pushing-down load is such a load that the outer peripheral surface of the vane 42 connected to the roller 59 is urged back by the vapor pressure in the vane chamber 54. The magnitude of the vane pushing-down load is relied on the pressure and amount of the vapor supplied to the vane chamber 54 to push the outer peripheral surface of the vane 42, and the direction of the vane pushing-down load is a negative direction (radially inward). The three loads are varied momentarily at a cycle of a half rotation of the rotor 31, and a reaction to a total load which is a sum total of the three loads is repeatedly applied from the annular groove 60 to the roller 59 to influence the durability of the roller 59.

Figure 15:
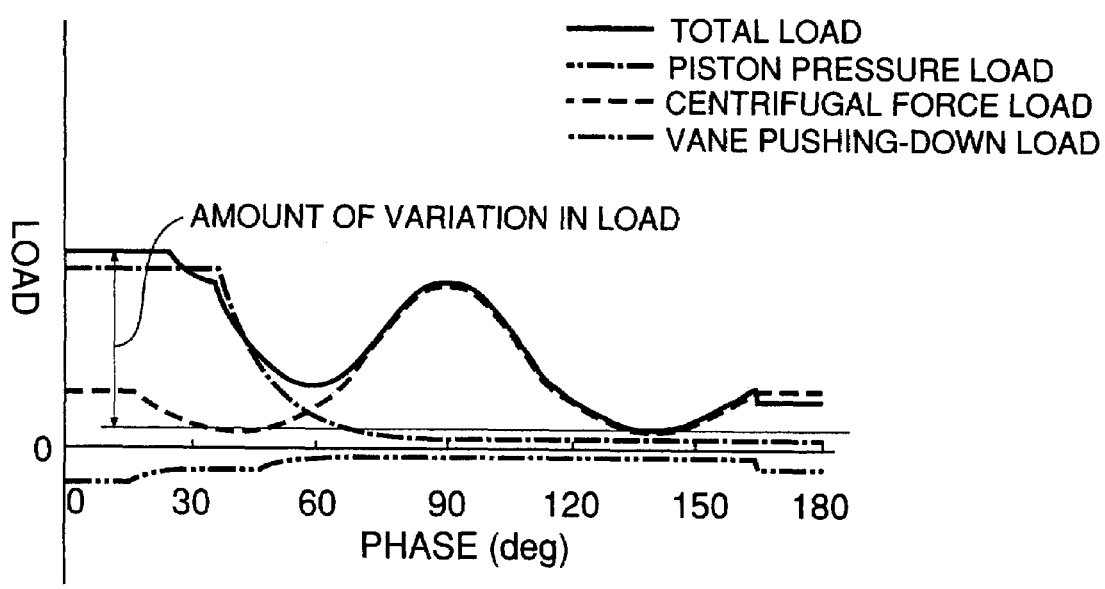
Figure 16:
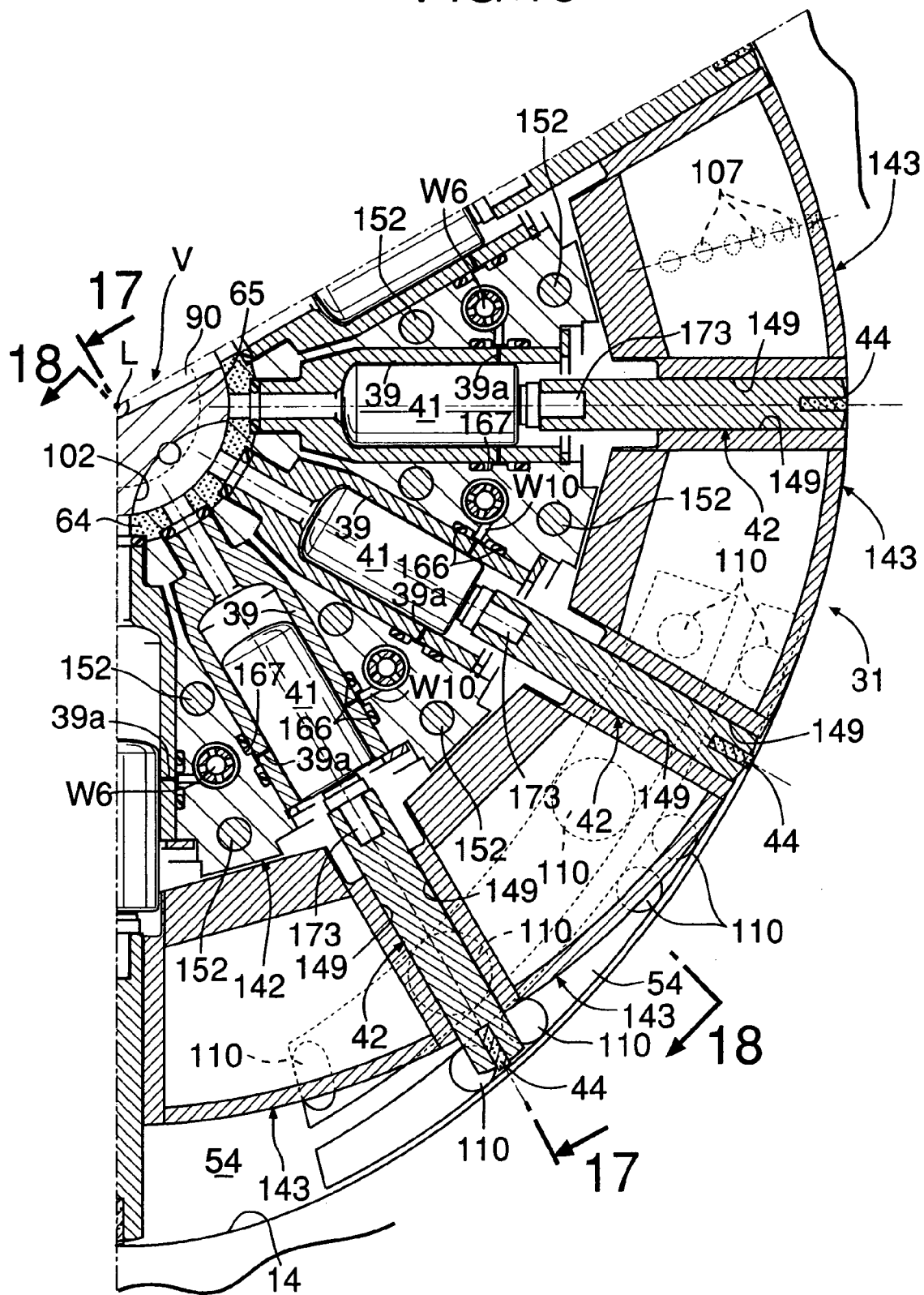
FIGS. 16 to 20 show a second embodiment of the present invention.
Figure 17:
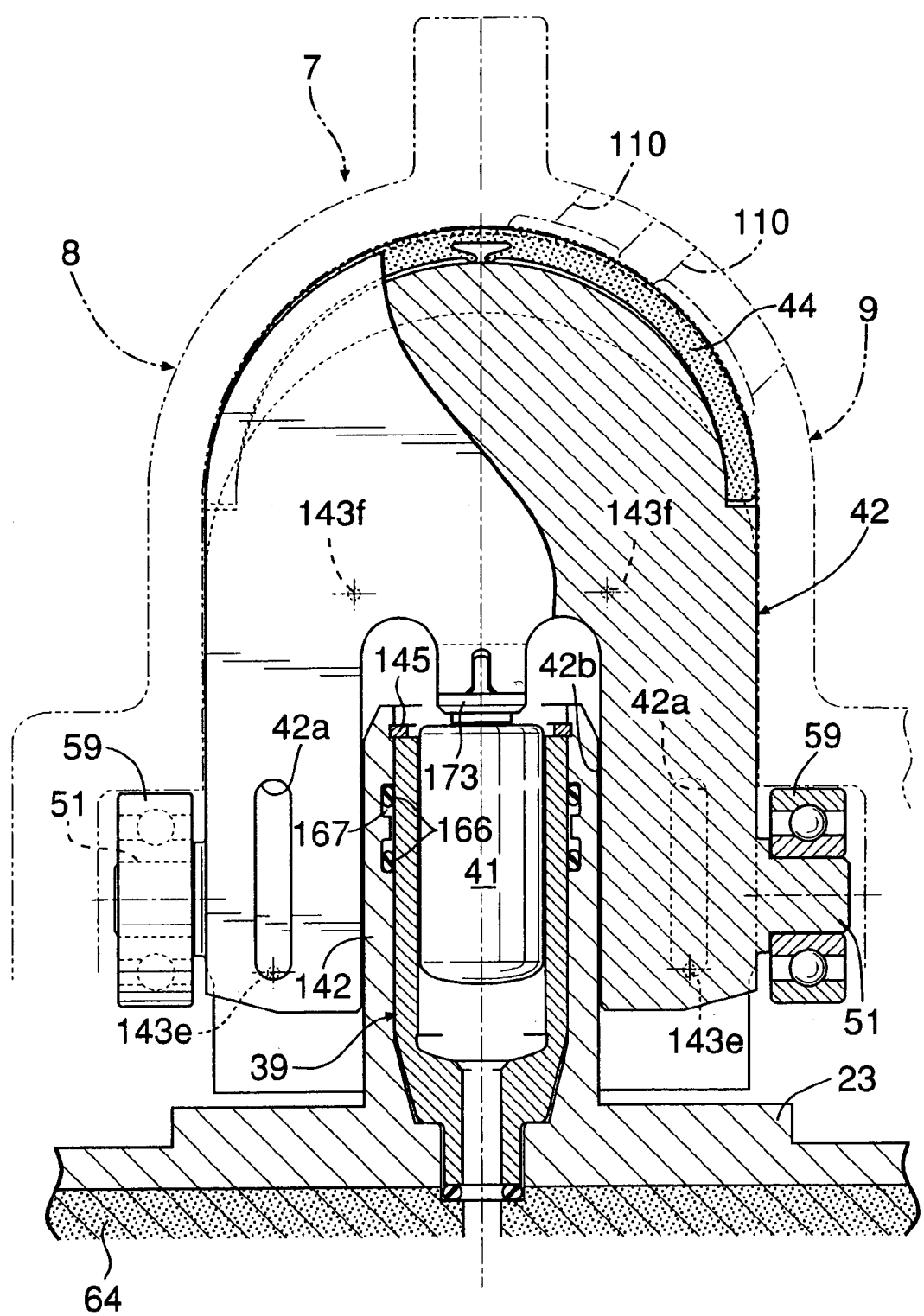
Figure 18:
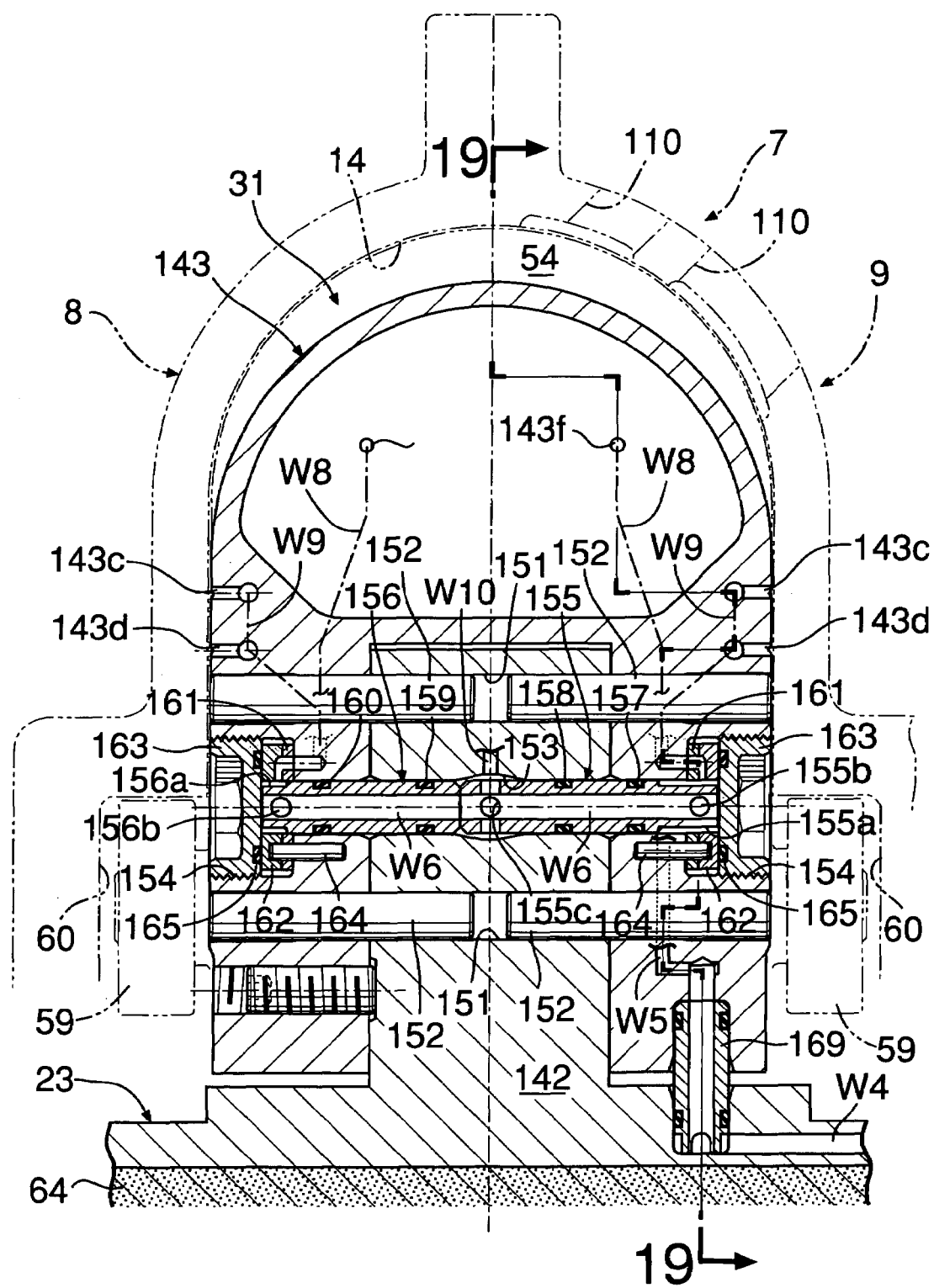
Figure 19:
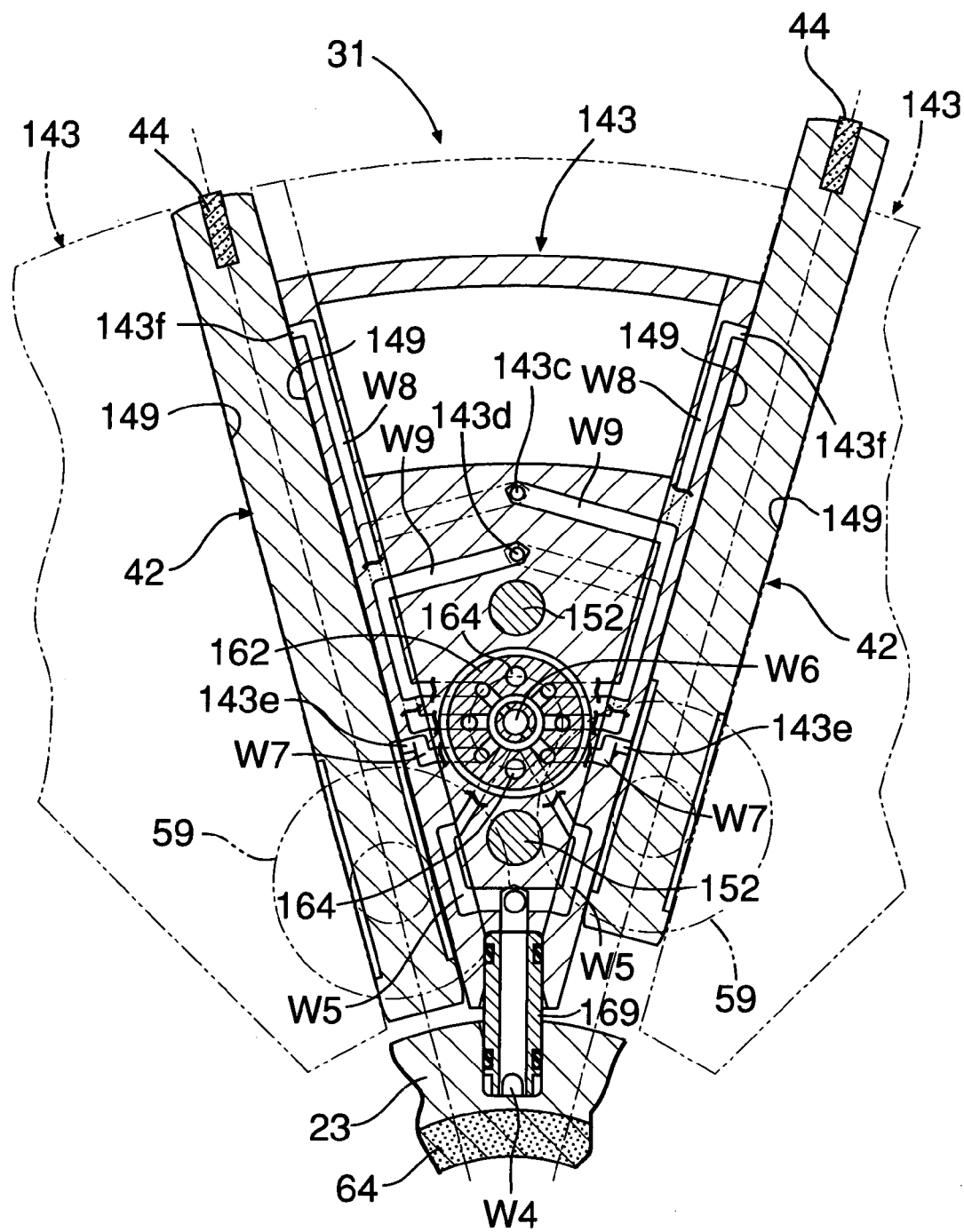
Figure 20:
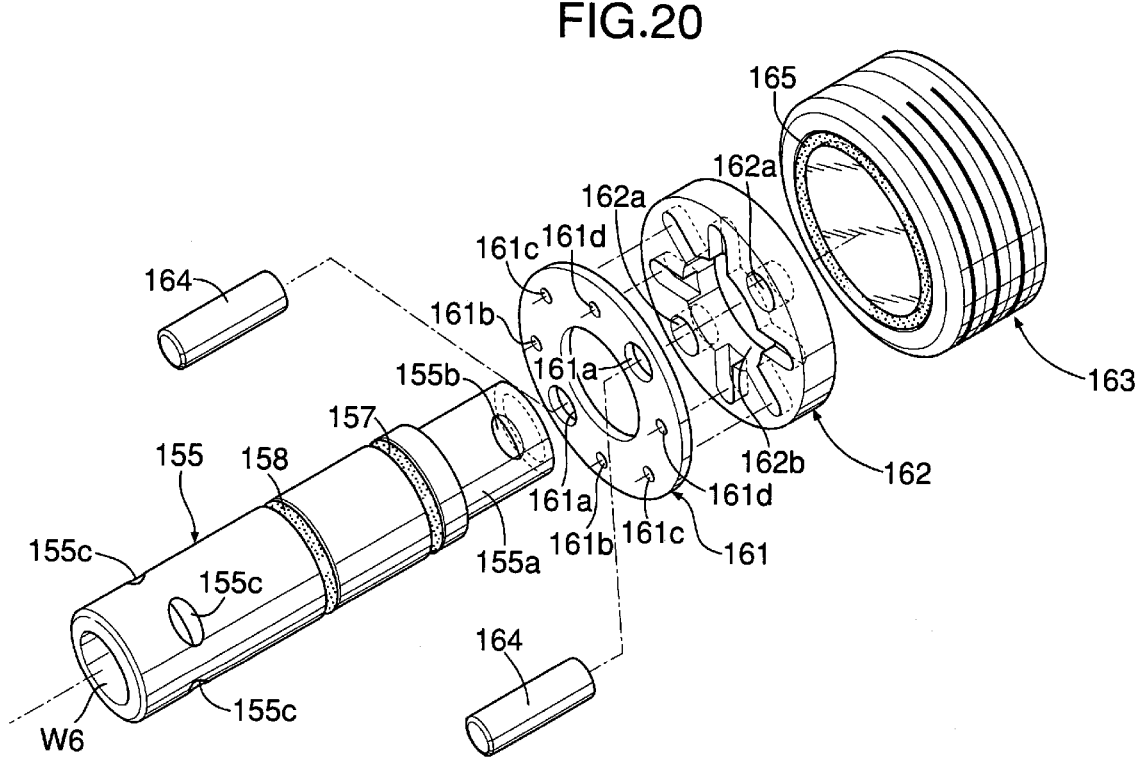
Figure 21:
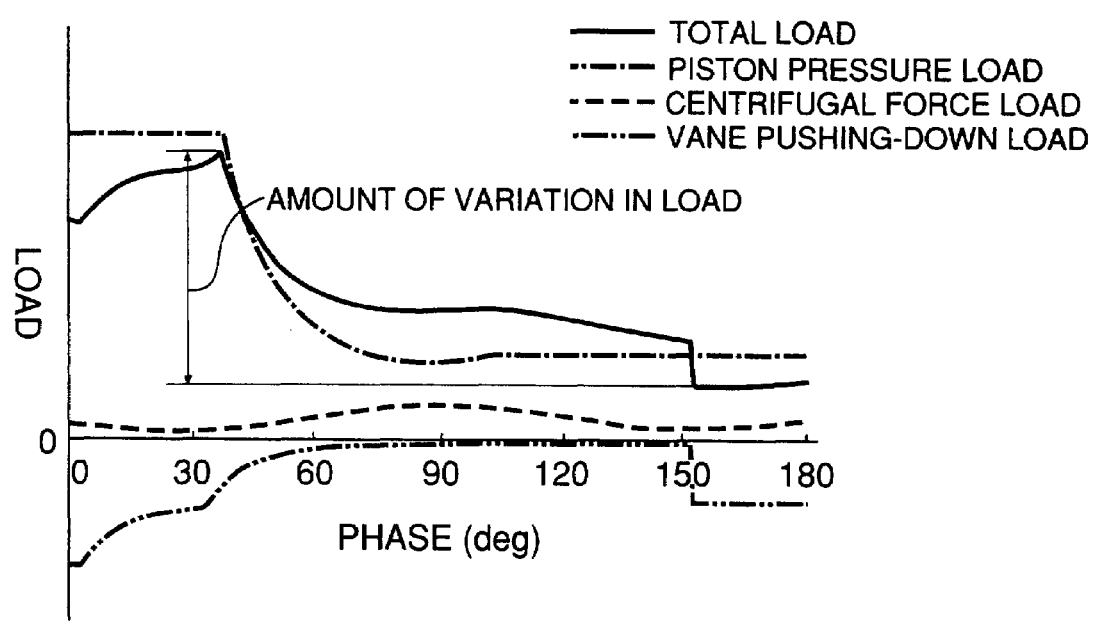
FIG. 21 is a graph showing the relationship between the phase of the roller and the load in the prior art.

Amounts of variations in the above-described loads and the total load in the present embodiment are shown in FIG. 15, and amounts of variations in the above-described loads and the total load in the prior art are shown in FIG. 21. In any case of FIGS. 15 and 21, the piston pressure load assumes a flat peak value in a phase region smaller than 40°, namely, in a region where the vapor is supplied to the cylinder 39, and is gradually decreased from such region. The centrifugal force load assumes a peak value in a phase region near to 90°, namely, in a region where the vane piston units U1 to U12 are moved most to the radially outward positions, and is decreased before and after such region. The vane pushing-down load assumes a negative flat peak value in a phase region near to 0° and a phase region near to 180°, namely, in a region where the vane chamber 54 is put into communication with the introducing bores 106, and assumes a small negative value in other regions.

As is apparent from the comparison of FIGS. 15 and 21 with each other, the total load in the present embodiment has a small range of variation, as compared with the prior art; and the peak value regions thereof is dispersed to a region of 0° to 15° and to a region near to 90°, and the entire variation is smooth. Therefore, it is possible to prolong the fatigue life of the roller 59 to enhance the durability thereof. More specifically, in the present embodiment, the piston pressure load has a peak value region in a region of 0° to 40°, and the centrifugal force load has a peak value region in the region near to 90° and thus, a load variation characteristic smooth in variation as a whole and having the small variation range is provided by completely displacing the phases of both of the peak value regions and substantially equalizing both of the peak values to each other. The vane pushing-down load assumes a negative peak value region in the region of 0° to 15°, but the a positive peak value region (0° to 40°) of the piston pressure load is overlapped on the negative peak value region (0° to 15°) of the vane pushing-down load and a bottom value region (near to 40°) of the centrifugal force load, thereby contributing to a decrease in total peak value in the region of 0° to 40°.

A second embodiment of the present invention will now be described with reference to FIGS. 16 to 20. An expander 4 in the second embodiment is basically similar to the expander 4 in the first embodiment, except that a water lubricating function for the vanes 42 and a water sealing function for the cylinders 39 are added. Members or portions in the second embodiment corresponding to those in the first embodiment are designated by the same reference characters as in the first embodiment.

A rotor 31 includes a rotor core 142 integrally formed on an outer periphery of an output shaft 23, and twelve rotor segments 143 fixed to cover the periphery of the rotor core 142 and forming an outer profile of the rotor 31. Twelve cylinders 39 made of a ceramic (or carbon) are mounted radially on the rotor core 142 at distances of 30° and fixed by clips 145, so that they are prevented from being withdrawn.

Each of the rotor segments 143 is a hollow wedge-shaped member having a center angle of 30°, and two recesses 143a and 143b are defined in a surface of each of the rotor segments 143 opposed to the rotor chamber 14 to extend in an arcuate shape about the axis L. Lubricating-water ejection bores 143c and 143d open into central portions of the recesses 143a and 143b. Four lubricating-water ejection bores 143e, 143e; 143f, 143f also open into an end face of each of the rotor segments 143, namely, a face opposed to the vane 42.

A through-bore 153 is defined between two knock pin bores 151, 151 to extend through the rotor segment 143 and the rotor core 142, and recesses 154, 154 are defined in opposite ends of the through-bore 153, respectively. Two pipe members 155 and 156 are fitted in the through-bore 153 with seal members 157, 158, 159 and 160, and an orifice-defined plate 161 and a lubricating water-dispensing member 162 are fitted in each of the recesses 154 and fixed by a nut 163. The orifice-defined plate 161 and the lubricating water-dispensing member 162 are fixed and prevented from being turned relative to each of the rotor segments 143 by two knock pins 164, 164 passed through knock pin bores 161a, 161a in the orifice-defined plate 161 and fitted into knock pin bores 162a, 162a in the lubricating water-dispensing member 162, and the lubricating water-dispensing member 162 and the nut 163 are sealed from each other by an O-ring 165.

A smaller-diameter portion 155a formed at an outer end of one of the pipe members 155 communicates with a sixth water passage W6 in the pipe member 155 through a through-bore 155b, and communicates with a radial dispensing groove 162b defined in one side of the lubricating water-dispensing member 162. A dispensing groove 162b in the lubricating water-dispensing member 162 extends in six directions with its tip ends communicating with six orifices 161b, 161b; 161c, 161c; 161d, 161d in the orifice-defined plate 161. The orifice-defined plate 161, the lubricating water-dispensing member 162 and the nut 163 mounted at the outer end of the other pipe member 156 have the same structures as those of the orifice-defined plate 161, the lubricating water-dispensing member 162 and the nut 163, which are described above.

Downstream portions of the two orifices 161b, 161b in the orifice-defined plate 161 communicate with the two lubricating water ejection bores 143e, 143e opening in an opposed relation into the vane 42 through seventh water passages W7, W7 defined in the rotor segment 143, and downstream portions of the other two orifices 161c, 161c communicate with the two lubricating water ejection bores 143f, 143f opening in an opposed relation into the vane 42 through eighth water passages W8, W8 defined in the rotor segment 143. Downstream portions of the further other orifices 161d, 161d communicate with the two lubricating water ejection bores 143c, 143c opening in an opposed relation into the rotor chamber 14 through ninth water passages W9, W9 defined in the rotor segment 143.

An annular groove 167 is provided around an outer periphery of the cylinder 39 and defined by a pair of O-rings 166, 166, and the sixth water passage W6 defined in the one pipe member 155 communicates with the annular groove 167 through four through-bores 155c extending through the pipe member 155 and a tenth water passage W10 defined in the rotor core 142. The annular groove 167 communicates with sliding surfaces of the cylinder 39 and the piston 41 through an orifice 39a. The position of the orifice 39a in the cylinder 39 is set at a location which is not deviated from the sliding surface of the piston 41, when the piston 41 is moved between top and bottom dead centers, namely, at a location where the piston 41 is always opposed in a sliding state to the cylinder 39.

First to third water passages (not shown) communicate with the smaller-diameter portion 155a of the one pipe member 155 through a fourth water passage W4 defined in the output shaft 23 and fifth water passages W5, W5 which are defined to bypass the pipe member 169 extending stride the rotor core 142 and the rotor segment 143 and the radially inner knock pin 152 in the rotor segment 143.

Twelve vane grooves 149 are defined between the adjacent rotor segments 143 of the rotor 31 to extend radially, and plate-shaped vanes 42 are slidably fitted into the vane grooves 149, respectively. Two recesses 42a, 42a are defined in each of opposite sides of the vane 42 and opposed to the radially inner two lubricating water ejection bores 143e, 143e opening into an end face of the rotor segment 143. A piston-receiving member 173 mounted at the center of a notch 42b in the vane 42 to protrude radially inwards abuts against a radially outer end of the piston 41.

The operation of the second embodiment having the above-described arrangement will be described below.

The supplying of lubricating water is carried out by utilizing a supply pump 6 (see FIG. 1) for supplying the water from the condenser 5 to the evaporator 3 under a pressure, and a portion of the water discharged by the supply pump 6 is supplied as lubricating water. In this way, by utilizing the supply pump 6 for supplying the water to static pressure bearings at various portions of the expander 4, a special pump is not required, leading to a reduction in number of parts.

The water from the supply pump 6 flows through the first to third water passages (not shown), the fourth water passage W4 in the output shaft 23 and the fifth water passages W5, W5 defined in the pipe member 169 and the rotor segment 143 into the smaller-diameter portion 155a of one 155 of the pipe members, and the water flowing into the smaller-diameter portion 155a flows via the through-bore 155b in the one pipe member 155, the sixth water passage W6 defined in both of the pipe members 155 and 156 and the through-bore 156b defined in the other pipe member 156 into the smaller-diameter portion 156a of the other pipe member 156.

A portion of the water flowing from the smaller-diameter portion 155a, 156a of each of the pipe members 155 and 156 via the dispensing groove 162b in each of the lubricating water-dispensing member 162 and passed through the six orifices 161b, 161b; 161c, 161c; 161d, 161d in the orifice-defined plate 161 is ejected from the four lubricating water ejection bores 143e, 143e; 143f, 143f opening into the end face of the rotor segment 143, and another portion of the water is ejected from the lubricating water ejection bores 143c and 143d in the arcuate recesses 143a and 143b defined in the side of the rotor segment 143.

The water ejected from the lubricating water ejection bores 143e, 143e; 143f, 143f in the end face of each of the rotor segments 143 into the vane groove 149 forms a static pressure bearing between the wall of the vane groove 149 and the vane 42 slidably received in the vane groove 149 to support the vane 42 in a floated state, thereby preventing the solid contact of the end face of the rotor segment 143 and the vane 42 with each other to prevent the occurrences of the seizure and the wearing. By supplying the water for lubricating the sliding surface of the vane 42 through the water passages provided radially in the rotor 31 in the above manner, it is possible not only to pressurize the water by the centrifugal force, but also to stabilize the temperature around the rotor 31 to decrease the influence due to the thermal expansion, thereby maintaining the set clearance to minimize the leakage of the vapor.

In addition, since the water is retained in the two recesses 42a, 42a defined in each of the opposite surfaces of the vane 42, the recesses 42a, 42a serve as pressure dams to suppress a drop in pressure due to the leakage of the water. As a result, the vane 42 clamped between the end faces of a pair of the rotor segments 143, 143 is retained in the floated state by the water, whereby the sliding resistance can be reduced to near zero. When the vane 42 is moved reciprocally, the radial position of the vane 42 relative to the rotor 31 is changed, but the vane 42 moved reciprocally can be always retained in the floated state to reduce the sliding resistance effectively, because the recesses 42a, 42a are provided in the vane 42 rather than in the rotor segment 143 and provided in the vane 42 in the vicinity of the rollers 59, 59 to which the load is applied to the most extent.

The water which has lubricated the sliding surface of the vane 42 relative to the rotor segment 143 is moved radially outwards by the centrifugal force to lubricate the sliding portions of the seal member 44 mounted on the vane 42 and the rotor chamber 14. The water which has finished the lubrication is discharged from the rotor chamber 14 through the first and second discharging bore groups 110 and 111.

By ejecting the water from the lubricating water ejection bores 143c and 143d defined in the recesses 143a and 143b in the rotor segment 143 to form the static pressure bearing on the sliding surface of the rotor 31 relative to the rotor chamber 14, the side of the rotor 31 can be sealed, and as a result, the vapor within the rotor chamber 14 can be prevented from being leaked through the clearance between the rotor chamber 14 and the rotor 31. The rotor chamber 14 and the rotor 31 are isolated from each other by the water film supplied from the lubricating water ejection bores 143c and 143d, so that they are prevented from being brought into solid contact with each other, whereby the stable sealing performance can be ensured, while minimizing the frictional force.

The water which has lubricated the sliding portions of the rotor chamber 14 and the rotor 31 is supplied to the rotor chamber 14 by the centrifugal force and discharged therefrom via the first and second discharging bore groups 110 and 111 to the outside of the casing 7.

The water supplied from the sixth water passage W6 in the pipe member 155 via the tenth water passage W10 in the rotor segment 143, the annular groove 167 around the outer periphery of the cylinder 39 and the orifice 39a to the sliding surfaces of the cylinder 39 and the piston 41 exhibits a sealing function by virtue of the viscosity of the water film formed on the sliding surfaces, and the high-temperature and high-pressure vapor supplied to the cylinder 39 is prevented effectively from being leaked through the sliding surface of the cylinder relative to the piston 41. At this time, the water supplied through the inside the expander 4 which is in a high-temperature state to the sliding surfaces of the cylinder 39 and the piston 41 has been warmed and hence, the high-temperature and high-pressure vapor supplied to the cylinder 39 is cooled by such water, whereby a reduction in output from the expander 4 can be minimized.

Moreover, the water which is the same substance as the vapor is used as the sealing medium and hence, even if the water is incorporated into the vapor, there is no problem. If the sliding surfaces of the cylinder 39 and the piston 41 are sealed by an oil, it is not avoided that the oil is incorporated into the water or the vapor and hence, a special filter device for separating the oil is required. In addition, a portion of the water for lubricating the sliding surfaces of the vane 42 and the vane groove 149 is bypassed and also used to seal the sliding surfaces of the cylinder 39 and the piston 41 and hence, the structure of the water passages for guiding the water to the sliding surfaces can be simplified.

In addition to the above-described embodiment, in an arrangement ensuring the conversion of the advancing movements of the pistons 41 into the rotational movement of the rotor 31, the advancing movements of the pistons 41 can be received directly by the rollers 59 without through the vanes 42 and converted into the rotational movement by the engagement of the rollers 59 in the annular grooves 60. In addition, the vanes 42 may be always spaced at a substantially constant distance apart from the inner peripheral surface 45 and the opposed inner end faces 47 of the rotor chamber 14 as described above by cooperation of the rollers 59 and the annular grooves 60 with each other. Alternatively, the pistons 41 and the rollers 59, as well as the vanes 42 and the rollers 59 may cooperate with annular grooves 60 independently.

When the expander 4 is used as a compressor, the rotor 31 is rotated in the clockwise direction in FIG. 4 by the output shaft 23 to draw the open air as a fluid into the rotor chamber 14 through the first and second discharging bore groups 110 and 111 by the vanes 42. A low-compressed air produced in the above manner is supplied from the first and second introducing bore groups 107 and 108 to the larger-diameter cylinder bore f via the relay chamber 20, the through-bores t, the passage s, the first and second discharge bores 104 and 105, the first and second discharge ports 102 and 103 and the through-bores c. In addition, the piston 41 is operated by the vane 42 to covert low-pressure air into high-pressure air, which is introduced into the introducing pipe 80 via the through-bores c, the supply ports 90 and 91 and the first and second supply pipes 94 and 95.

In the above-described expander 4, a first energy-converting means including the cylinder members 39 and the pistons 41 and a second energy-converting means including the vanes 42 are provided in the common rotor 31, so that an energy of the high-temperature and high-pressure vapor is taken out as a mechanical energy into the output shaft 23 by cooperation of the first and second energy-converting means connected in line with each other. Therefore, the mechanical energy output by the first energy-converting means and the mechanical energy output by the second energy-converting means can be automatically unified through the rotor 31 and thus, a special energy-unifying means having a power-transmitting means such as a gear is not required.

Since the first energy-converting means includes the combination of the cylinders 39 and the pistons 41, in which it is easy to seal the working fluid, thereby ensuring that the leakage of the fluid is hard to occur, it is possible to enhance the sealability for the high-temperature and high-pressure vapor to minimize a reduction in efficiency due to the leakage. On the other hand, since the second energy-converting means includes the vanes 42 radially movably supported in the rotor 31, the vapor pressure applied to the vanes 42 is converted directly into the rotational movement of the rotor 31 and thus, a special converting mechanism for converting the reciprocal movement into the rotational movement is not required, leading to a simplified structure. Moreover, the second energy-converting means capable of effectively converting the vapor having a low pressure and a large flow rate into the mechanical energy is disposed to surround the first energy-converting means and hence, it is possible to reduce the size of the entire expander 4 for the compactness.

The first energy-converting means including the cylinders 39 and the pistons 41 has a characteristic that a high efficiency of conversion between the pressure energy and the mechanical energy is shown when the high-temperature and high-pressure vapor is used as a working fluid, and the second energy-converting means including the vanes 42 has a characteristic that a high efficiency of conversion between the pressure energy and the mechanical energy is shown even when a relatively low-temperature and relatively low-pressure vapor is used as a working fluid. Therefore, the energy included in the original high-temperature and high-pressure can be converted exhaustively and effectively into the mechanical energy by connecting the first and second energy-converting means in line to each other, and by passing the high-temperature and high-pressure vapor through the first energy-converting means to convert its energy into the mechanical energy and then passing the first dropped-temperature and dropped-pressure vapor having a resulting dropped pressure through the second energy-converting means to covert its energy again into the mechanical energy.

Even when the expander 4 in the present embodiment is used as the compressor, a mechanical energy can be efficiently converted into a pressure energy (a heat energy) of a compressed air by compressing air drawn into the rotor chamber 14 by rotating the rotor 31 by a mechanical energy input from the outside to raise its temperature by the second energy-converting means operated effectively even by a working fluid having a relatively low temperature and relatively low pressure, and further compressing the compressed and raised-temperature air to raise its temperature by the first energy-converting means operated effectively by a working fluid having a relatively high temperature and relatively high pressure. Thus, by combining the first energy-converting means including the cylinders 39 and the pistons 41 and the second energy-converting means including the vanes 42, a high-performance rotary fluid machine having characters of both of the converting means can be provided.

In addition, when the rotational axis L of the rotor 31 (namely, the rotational axis L of the output shaft 23) is matched with the center of the rotor chamber 14, and the rotor 27 is divided vertically and laterally at 90° into four components in FIGS. 4 and 5, the conversion of the pressure energy into the mechanism energy is carried out by a right and upper quarter and a left and lower quarter point-symmetric each other with respect to the rotational axis L. Therefore, it is possible to prevent an unbalanced load from being applied to the rotor 31 to suppress the generation of a vibration. In other words, the portions for converting the pressure energy of the working fluid into the mechanical energy and the portion for converting the mechanical energy into the pressure energy of the working fluid are disposed at two points displaced through 180° about the rotational axis L of the rotor 31. Therefore, a load applied to the rotor 31 is a force couple to enable the smooth rotation and moreover, an intake timing and an exhaust timing can be made efficiently.

In the present embodiment, in a Rankine cycle including the evaporator 3 for generating a high-temperature and high-pressure vapor by heating water by a heat energy of an exhaust gas from the internal combustion engine 1, the expander 4 for converting the high-temperature and high-pressure vapor supplied from the evaporator 3 into a shaft output having a constant torque, the condenser 5 for liquefying a dropped-temperature and dropped-pressure vapor discharged from the expander 4, and the supply pump 6 for supplying the water liquefied in the condenser 5 to the evaporator 3, a volume-type expander is employed as the expander 4. This volume-type expander 4 is capable of conducting the energy recovery at a high efficiency in a wide rotational speed region from a low speed to a high speed, as compared with a non-volume type expander such as a turbine, and moreover, is excellent in followability and responsiveness to a variation in heat energy of an exhaust gas (a variation in temperature and a variation in flow rate of the exhaust gas) attendant on an increase and decrease in rotational speed of the internal combustion engine 1. Moreover, the expander 4 is constructed as a double-expansion type in which the first energy-converting means including the cylinders 39 and the pistons 41 and the second energy-converting means including the vanes 42 are connected in line to each other and disposed at radially inner and outer locations. Therefore, the efficiency of the recovery of the heat energy by the Rankine cycle can be further enhanced, while reducing the size of the expander 4 to provide an enhancement in space efficiency.

Although the embodiments of the present invention have been described in detail, it will be understood that the present invention is not limited to the above-described embodiments, and various modifications in design may be made without departing from the spirit and scope of the invention defined in claims.

For example, the expander 4 has been exemplified as the rotary fluid machine in the embodiments, but the present invention is also applicable to a compressor.

Further, vapor and water are used as a gas-phase working medium and a liquid-phase working medium, but the other proper working medium can be used.

In addition, in the expander 4 in the embodiments, the high-temperature and high-pressure vapor is first supplied to the cylinders 39 and the pistons 41 forming the first energy-converting means, and the first dropped-temperature and dropped-pressure vapor resulting from the dropping of the temperature and pressure of the high-temperature and high-pressure vapor is then supplied to the vanes 42 forming the second energy-converting means. However, vapors having different temperatures and different pressures may be supplied individually to the first and second energy-converting means, for example, by ensuring that the through-bores t for discharging the first dropped-temperature and dropped-pressure vapor from the first energy-converting means shown in FIG. 2 and the relay chamber 20 are disposed in communication or non-communication with each other and further, constructing a means in the relay chamber 20 for enabling the vapor to be supplied independently to the second energy-converting means through the shell-shaped member 16. Further, vapors having different temperatures and different pressures may be supplied individually to the first and second energy-converting means, respectively, and the vapor passed through the first energy-converting means and having a dropped-temperature and a dropped pressure may be further supplied to the second energy-converting means.

INDUSTRIAL APPLICABILITY

The rotary fluid machine according to the present invention is suitable for use as an expander for a Rankine cycle system, but is capable of being used as an expander for any other application or a compressor for any other application.

What is claimed is:

1. A rotary fluid machine including:
   a rotor chamber (14);
   a rotor (31) rotatably accommodated in said rotor chamber (14);
   operating members (41, 42) radially movably supported in said rotor (31) and spaced from each other at a constant angle in a circumferential direction;
   operating chambers (39, 54) whose volumes are varied due to the movement of said operating members (41, 42) with the rotation of said rotor (31);
   so that a pressure energy of a gas-phase working medium supplied to and discharged from said operating chambers (39, 54) in response to the rotation of said rotor (31) and a rotational energy of said rotor (31) are converted from one into another,
   wherein the radial movements of said operating members (41, 42) are substantially stopped, so that the volumes of said operating chambers (39, 54) assume substantially constant values, for a period that includes:
   a first period from an end of an exhaust stroke at which the gas-phase working medium is discharged from said operating chambers (39, 54) to a start of an intake stroke at which the gas-phase working medium is supplied to said operating chambers (39, 54), said first period corresponding to said constant angle between said operating members;

a second period extending from a point preceding from the end of said exhaust stroke by one predetermined angle to said end of the exhaust stroke; and a third period extending from said start of the intake stroke to a point following said start of the intake stroke by another predetermined angle.

2. The rotary fluid machine according to claim 1, wherein said operating members are a plurality of vanes (42) which are supported radially in the rotor for movements into and from said rotor (31) and are in sliding contact with an inner peripheral surface of said rotor chamber (14);

wherein said operating chambers include a plurality of vane chambers (54) each of which is defined by adjacency to two of the vanes (42), an outer peripheral surface (36) of said rotor (31) and the inner peripheral surface (45) of said rotor chamber (14); and the shape of said rotor chamber (14) is determined, so that the volume of each of said vane chambers (54) assumes a substantially constant value for a period from the end of the exhaust stroke at which each of said vane chambers (54) and exhaust ports (110, 111) are put out of communication with each other to the start of the intake stroke at which each of said vane chambers (54) and intake ports (107, 108) are put into communication with each other.

3. The rotary fluid machine according to claim 1, wherein said operating chambers include a plurality of cylinders (39) which are provided radially in said rotor (31);

said operating members include a plurality of pistons (41) which are slidably received in said cylinders (39);

said rotary fluid machine further includes supply ports (90, 91) and discharge ports (102, 103) for supplying and discharging the gas-phase working medium to and from each of said cylinders (39) with the rotation of said rotor (31); and the radial movement of each of said pistons (41) is substantially stopped for a period from the closing of said discharge ports (102, 103) to the opening of said supply ports (90, 91).

4. The rotary fluid machine according to claim 1, wherein said operating members include a plurality of vanes (42) which are supported radially in said rotor (31) for movements into and from said rotor (31) and which are in sliding contact with an inner peripheral surface of said rotor chamber (14);

wherein said operating chambers include a plurality of vane chambers (54) each of which is defined by adjacency to two of the vanes (42), an outer peripheral surface (36) of said rotor (31) and the inner peripheral surface (45) of said rotor chamber (14); and the shape of the rotor chamber (14) is determined, so that the volume of each of said vane chambers (54) assumes a substantially constant value for a period from the end of the exhaust stroke at which each of said vane chambers (54) and exhaust ports (110, 111) are put out of communication with each other to the start of the intake stroke at which each of said vane chambers (54) and intake ports (107, 108) are put into communication with each other; and said operating chambers include a plurality of cylinders (39) which are provided radially in said rotor (31);

said operating members include a plurality of pistons (41) which are slidably received in said cylinders (39);

said rotary fluid machine further includes supply ports (90, 91) and discharge ports (102, 103) for supplying and discharging the gas-phase working medium to and from said cylinders (39) with the rotation of the rotor (31); and the radial movement of each of said pistons (41) is substantially stopped for a period from the closing of said discharge ports (102, 103) to the opening of said supply ports (90, 91).

5. The rotary fluid machine according to claim 1, wherein the rotor (31) is aligned with joined faces of a first casing half (8) and a second casing half (9).

6. The rotary fluid machine according to claim 1, wherein intake ports (107, 108) are formed in an arcuate area of a first casing half (8), and outlet ports (110, 111) are formed in a arcuate area of a second casing half (9).

7. The rotary fluid machine according to claim 1, further comprising rollers (59) rollably engaged in non-circular annular grooves (60) defined in opposed inner faces of a first casing half (8) and a second half (9).

8. The rotary fluid machine according to claim 7, wherein a distance between each of the annular grooves (60) and the rotor chamber (14) is constant over an entire periphery of the rotor chamber (14).

9. The rotary fluid machine according to claim 1, wherein said operating members include a plurality of pistons (41), and advancing movement of the pistons (41) is converted into the rotational movement of the rotor (31) by the engagement of rollers (59) and annular grooves (60) defined in opposed inner faces of a first casing half (9) and a second casing half (9).

10. A rotary fluid machine, comprising:

a rotor chamber (14);

a rotor (31) rotatably accommodated in said rotor chamber (14);

operating members (41, 42) radially movably supported in said rotor (31);

operating chambers (39, 54) whose volumes are varied due to the movement of said operating members (41, 42) with the rotation of said rotor (31);

so that a pressure energy of a gas-phase working medium supplied to and discharged from said operating chambers (39, 54) in response to the rotation of said rotor (31) and a rotational energy of said rotor (31) are converted from one into another;

wherein the radial movements of said operating members (41, 42) are stopped, so that the volumes of said operating chambers (39, 54) assume constant values, for a period from an end of an exhaust stroke at which the gas-phase working medium is discharged from said operating chambers (39, 54) to a start of an intake stroke at which the gas-phase working medium is supplied to said operating chambers (39, 54);

wherein said operating chambers are a plurality of cylinders (39) which are provided radially in said rotor (31);

said operating members are a plurality of pistons (41) which are slidably received in said cylinders (39);

said rotary fluid machine further includes supply ports (90, 91) and discharge ports (102, 103) for supplying and discharging the gas-phase working medium to and from each of said cylinders (39) with the rotation of said rotor (31); and the radial movement of each of said pistons (41) is stopped for a period from the closing of said discharge ports (102, 103) to the opening of said supply ports (90, 91); and wherein sliding surfaces of said rotor (31) and a plurality of vanes (42) are lubricated by a liquid-phase working medium, and a portion of the liquid-phase working medium for lubricating the sliding surfaces of said rotor (31) and said vanes (42) is supplied to the sliding surfaces of said cylinders (39) and said pistons (41) to seal them.

11. A rotary fluid machine including:

a rotor chamber (14);

a rotor (31) rotatably accommodated in said rotor chamber (14);

operating members (41, 42) radially movably supported in said rotor (31);

operating chambers (39, 54) whose volumes are varied due to the movement of said operating members (41, 42) with the rotation of said rotor (31);

so that a pressure energy of a gas-phase working medium supplied and discharged to and from said operating chambers (39, 54) in response to the rotation of said rotor (31) and a rotational energy of said rotor (31) are converted from one into another, wherein the radial movements of said operating members (41, 42) are substantially stopped, so that the volumes of said operating chambers (39, 54) assume substantially constant values, for a period from the end of an exhaust stroke at which the gas-phase working medium is discharged from said operating chambers (39, 54) to the start of an intake stroke at which the gas-phase working medium is supplied to said operating chambers (39, 54), wherein a phantom plane A of the rotor chamber (14) including a rotational axis L of the rotor (31) includes a pair of semi-circular section portions B 1 opposed to each other, and wherein the operating members (42) include semi-arcuate portions (46) corresponding to an inner peripheral surface (45) formed by the semi-circular section portions B1 of the rotor chamber (14).

12. The rotary fluid machine according to claim 11, wherein said operating members include a plurality of vanes (42) which are supported radially in the rotor for movements into and from said rotor (31) and are in sliding contact with an inner peripheral surface of said rotor chamber (14);

said operating chambers include a plurality of vane chambers (54) each of which is defined by adjacency to two of the vanes (42), an outer peripheral surface (36) of said rotor (31) and the inner peripheral surface (45) of said rotor chamber (14); and the shape of said rotor chamber (14) is determined, so that the volume of each of said vane chambers (54) assumes a substantially constant value for a period from the end of the exhaust stroke at which each of said vane chambers (54) and exhaust ports (110, 111) are put out of communication with each other to the start of the intake stroke at which each of said vane chambers (54) and intake ports (107, 108) are put into communication with each other.

13. The rotary fluid machine according to claim 11, wherein said operating chambers include a plurality of cylinders (39) which are provided radially in said rotor (31);

said operating members include a plurality of pistons (41) which are slidably received in said cylinders (39);

said rotary fluid machine further includes supply ports (90, 91) and discharge ports (102, 103) for supplying and discharging the gas-phase working medium to and from each of said cylinders (39) with the rotation of said rotor (31); and the radial movement of each of said pistons (41) is substantially stopped for a period from the closing of said discharge ports (102, 103) to the opening of said supply ports (90, 91).

14. The rotary fluid machine according to claim 11, wherein said operating members include a plurality of vanes (42) which are supported radially in said rotor (31) for movements into and from said rotor (31) and which are in sliding contact with an inner peripheral surface of said rotor chamber (14);

said operating chambers include a plurality of vane chambers (54) each of which is defined by adjacency to two of the vanes (42), an outer peripheral surface (36) of said rotor (31) and the inner peripheral surface (45) of said rotor chamber (14); and the shape of the rotor chamber (14) is determined, so that the volume of each of said vane chambers (54) assumes a substantially constant value for a period from the end of the exhaust stroke at which each of said vane chambers (54) and exhaust ports (110, 111) are put out of communication with each other to the start of the intake stroke at which each of said vane chambers (54) and intake ports (107, 108) are put into communication with each other; and said operating chambers include a plurality of cylinders (39) which are provided radially in said rotor (31);

said operating members include a plurality of pistons (41) which are slidably received in said cylinders (39);

said rotary fluid machine further includes supply ports (90, 91) and discharge ports (102, 103) for supplying and discharging the gas-phase working medium to and from said cylinders (39) with the rotation of the rotor (31); and the radial movement of each of said pistons (41) is substantially stopped for a period from the closing of said discharge ports (102, 103) to the opening of said supply ports (90, 91).

15. The rotary fluid machine according to claim 13, wherein sliding surfaces of said rotor (31) and a plurality of vanes (42) are lubricated by the liquid-phase working medium, and a portion of the liquid-phase working medium for lubricating the sliding surfaces of said rotor (31) and said vanes (42) is supplied to the sliding surfaces of said cylinders (39) and said pistons (41) to seal them.

16. The rotary fluid machine according to claim 11, wherein the rotor (31) is aligned with joined faces of a first casing half (8) and a second casing half (9).

17. The rotary fluid machine according to claim 11, wherein intake ports (107, 108) are formed in an arcuate area of a first casing half (8), and outlet ports (110,111) are formed in a arcuate area of a second casing half (9).

18. The rotary fluid machine according to claim 11, further comprising rollers (59) rollably engaged in non-circular annular grooves (60) defined in opposed inner faces of a first casing half (8) and a second casing half (9).

19. The rotary fluid machine according to claim 18, wherein a distance between each of the annular grooves (60) and the rotor chamber (14) is constant over an entire periphery of the rotor chamber (14).

20. The rotary fluid machine according to claim 11, wherein said operating members include a plurality of pistons (41), and advancing movement of the pistons (41) is converted into the rotational movement of the rotor (31) by the engagement of rollers (59) and annular grooves (60) defined in opposed inner faces of a first casing half (8) and a second casing half (9).

* * * * *